(12) United States Patent
Wilby et al.

(10) Patent No.: US 10,031,216 B2
(45) Date of Patent: Jul. 24, 2018

(54) SYNTHETIC APERTURE SONAR SYSTEM FOR INSPECTING UNDERWATER SURFACES

(71) Applicant: Raytheon Company, Waltham, MA (US)

(72) Inventors: Andrew Wilby, Warwick, RI (US); William Gilmour, San Ramon, CA (US)

(73) Assignees: Raytheon Company, Waltham, MA (US); Chevron U.S.A. Inc., San Ramon, CA (US)

( * ) Notice: Subject to any disclaimer, the term of this patent is extended or adjusted under 35 U.S.C. 154(b) by 527 days.

(21) Appl. No.: 14/644,866

(22) Filed: Mar. 11, 2015

(65) Prior Publication Data

US 2016/0266251 A1    Sep. 15, 2016

(51) Int. Cl.
*G01S 7/52* (2006.01)
*G01S 7/524* (2006.01)
*G01S 15/89* (2006.01)

(52) U.S. Cl.
CPC .......... *G01S 7/524* (2013.01); *G01S 15/8922* (2013.01)

(58) Field of Classification Search
CPC ...... G01S 15/88; G01S 7/52003; G01S 7/521; G01S 7/536; G01S 15/8904; G01V 1/20; G01V 1/3808; G01V 1/3835; G01V 1/3852
See application file for complete search history.

(56) References Cited

U.S. PATENT DOCUMENTS

| 6,104,673 | A  | * | 8/2000  | Cole ................... | G01S 7/52017 367/11 |
| 6,741,711 | B1 |   | 5/2004  | Sibbald |  |
| 7,046,582 | B1 |   | 5/2006  | Kosalos et al. |  |
| 2003/0206640 | A1 |   | 11/2003 | Malvar et al. |  |
| 2013/0258811 | A1 | * | 10/2013 | Guigne ................... | G01S 15/88 367/88 |

FOREIGN PATENT DOCUMENTS

| EP | 1 160 584 A2 | 12/2001 |
| GB | 2 430 743 A  | 4/2007  |

OTHER PUBLICATIONS

Analog Devices Datasheet AD9850; "CMOS 125 MHz Complete DDS Synthesizer;" Jan. 1, 2013; 20 pages.
PCT International Search Report and Written Opinion dated Aug. 9, 2016 corresponding to International Application No. PCT/US2016/020580; 11 Pages.
Non-final Office Action dated Jan. 29, 2018 for U.S. Appl. No. 15/059,618; 8 pages.
"Beamwidth" Wikipedia dated Dec. 21, 2017; https://en.wikipedia.org/wiki/Beamwidth; 2 pages.

(Continued)

*Primary Examiner* — Luke D Ratcliffe
(74) *Attorney, Agent, or Firm* — Daly, Crowley, Mofford & Durkee, LLP

(57) ABSTRACT

A method uses an underwater vehicle travelling along an underwater surface projecting high frequency sound at the underwater surface to produce an image of the underwater surface with sufficient along track and cross track resolution to be able to identify cracks or other irregularities in the underwater surface.

20 Claims, 20 Drawing Sheets

(56) References Cited

OTHER PUBLICATIONS

Response to U.S. Non-Final Office Action dated Jan. 29, 2018 for U.S. Appl. No. 15/059,618; Response filed on Mar. 19, 2018; 14 pages.
Notice of Allowance dated Apr. 20, 2018 for U.S. Appl. No. 15/059,618; 8 pages.
Response to EPO Communication filed Apr. 30, 2018 for EP Pat. Appl. No. EP16726439.9; 3 pages.
Amended Specification to EPO Communication filed Apr. 30, 2018 for EP Pat. Appl. No. EP16726439.9; 3 pages.
Amended Claims to EPO Communication filed Apr. 30, 2018 for EP Pat. Appl. No. EP16728439.9; 4 pages.

* cited by examiner

| Target Parameter | Useful | Goal | Units |
|---|---|---|---|
| Frequency of operation | 3.5->5.0 | 3.5->5.0 | MHz |
| Bandwidth | 1.5 | 1.5 | MHz |
| Power | 100 | 30 | Watts |
| Recording Length | 2 | 24 | Hours |
| Operating Range | 15 | 20 | Ft |
|  | 4.57 | 6.10 | m |
| Weight in water | 10 | 0 | lbs |
|  | 4.53 | 0 | kg |
| Number of elements | 40 | 40 | elements |
| Element length | 2 | 1 | mm |
| Cross Range resolution | 1 | 0.5 | mm |
| Range resolution | 1 | 0.5 | mm |
| Source Level | 191 | 191 | dBre uPa |
| Receive Sensitivity | -224 | -224 | dB re(V/uPa) |
| Electronic Noise Floor (reflected into water) | 55 | 55 | dB re uPa |
| Pulse Length | 10 | 10 | milliseconds |
| PRI | 12 | 12 | Milleseconds |
| Operational Speed | 2 | 3 | Knots |
| Advance per Ping | 1.028 | 1.543 | m/s |
|  | 1.233 | 1.85cm | cm |
| Overlapping Phase Centers | 15 | 3 | Phase centers |

FIG. 3

| | |
|---|---|
| frequency (center) | 4250000.0000 per sec |
| soundspeed | 1500.0000 m/s |
| wavelength | 0.0004 m |
| | 0.013895322 inch |
| xmit opening angle | 60.0000 |
| sphere radius of curvature | 2.3600 inch |
| | 0.059944 m |
| element arc length | 2.4714 inch |
| | 0.06277321 m |
| rel dielectric const (ceramic) | 600.00 |
| element thickness (ceramic) | 0.018000000 in |
| | 0.0004572 m |
| element cap (ceramic) | 3.5960E-08 F |
| Zmag = 1/(2*Pi*C) (ceramic) | 1.041377281 ohms |

*FIG. 8*

| array length (in) | 1.57480315 |
| number of elm | 40 |
| kerf (in) | 0.00500 |
| "gap" (in) | 0.00500 |
| calculated gap (in) | 0.00500 |
| elm length (in) | 0.03450 |
| ctc spacing (in) | 0.03950 |
| gap + elmwidth | 0.03950 |
| element length (m) | 0.000876175 |
| ctc spacing (m) | 0.001003175 |

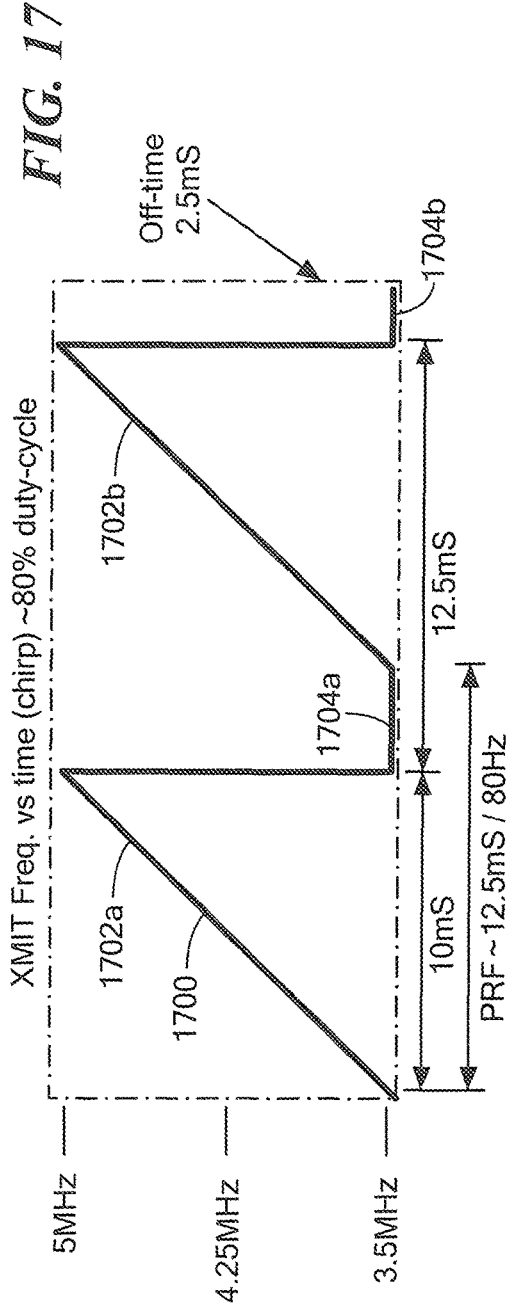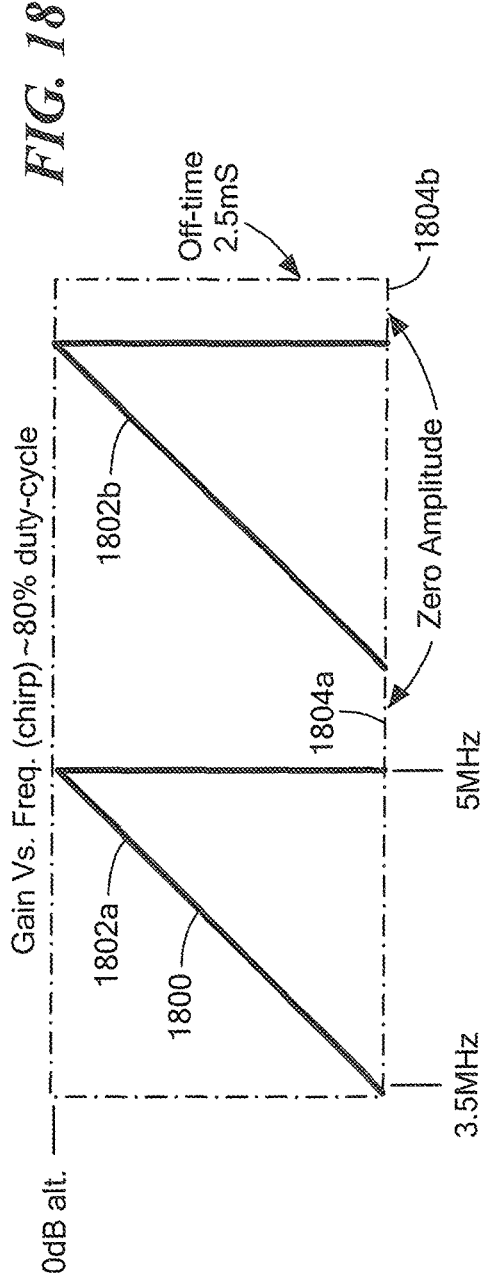

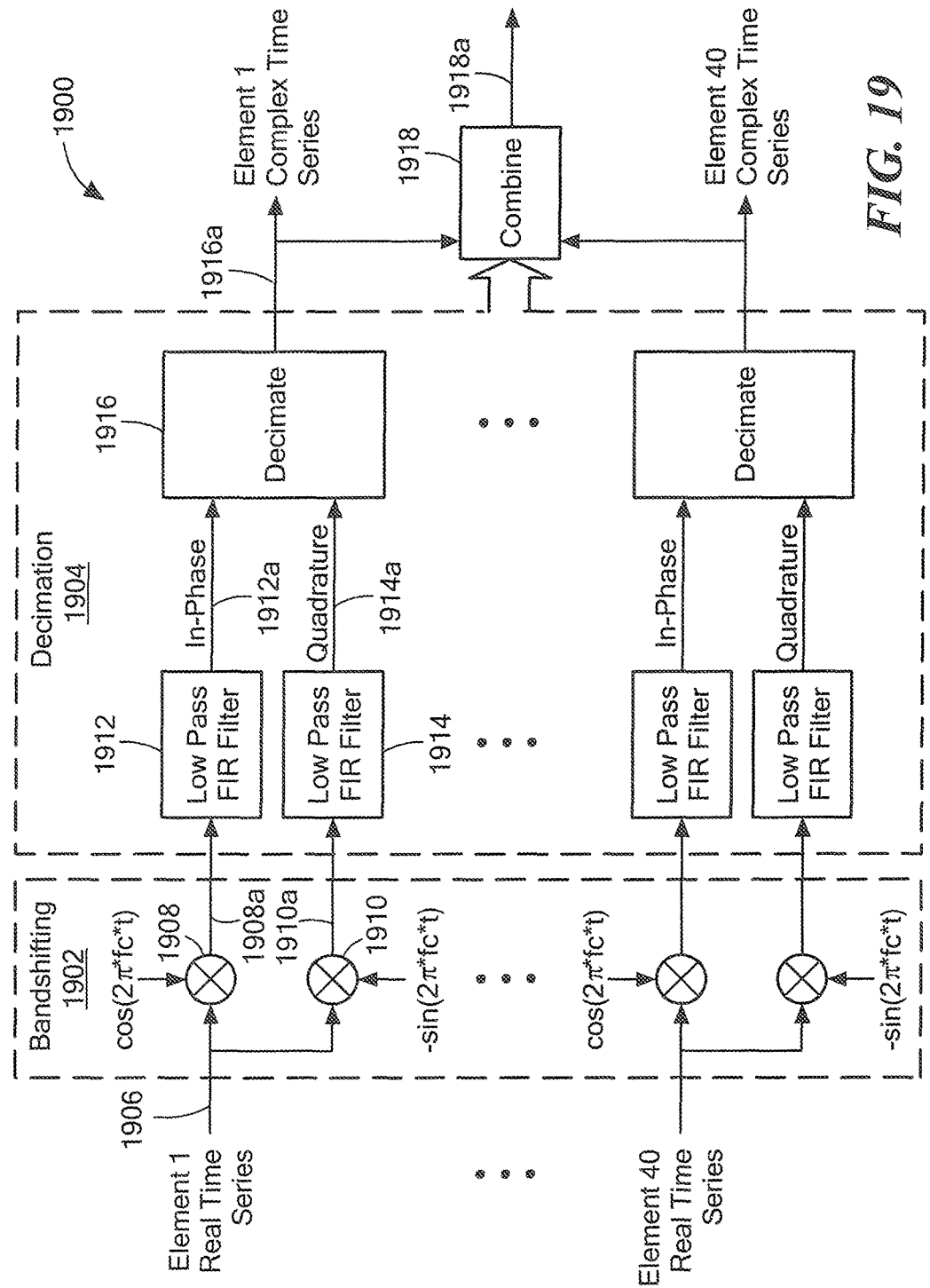

SYNTHETIC APERTURE SONAR SYSTEM FOR INSPECTING UNDERWATER SURFACES

FIELD OF THE INVENTION

This invention relates generally to sonar systems and, more particularly, to an autonomous sonar system that can detect cracks or other irregularities in an underwater surface.

BACKGROUND

It is known that some underwater structures, for example, underwater pipes, are subject to cracks. Cracks in underwater pipes can be detected with conventional apparatus that travels inside of the pipes and that can detect the cracks ultrasonically. Such techniques generally require that the flow of material in the pipes be temporarily suspended while the inspection of the pipes is ongoing.

The ability to image, with sonar systems, the outside of underwater pipes and other comparatively smooth surfaced underwater objects, particularly to identify irregularities or cracks, is difficult, in part because the wavelength used in typical imaging sonar is typically on the order of several millimeters to several centimeters. It is not possible to distinguish features on the target surface which are at, or smaller than, the wavelength of the sonar system. Cracks can be less than one millimeter across.

Optical techniques, either LIDAR or conventional photography, have an advantage because the wavelength of light is much shorter than the wavelength of sound, and thus, the optical system can achieve higher image resolution than a conventional sonar system. However, optical techniques also have disadvantages because they cannot be used effectively in turbid (murky) waters. Also, even at short range, optical techniques tend to require the use of high energy illumination which is not well suited for being use on a small autonomous underwater vehicle (AUV) with limited internal power capability.

Active sonar systems transmit a signal into the water, and receive echoes from targets or surfaces in the water. The targets can include, but are not limited to, submarines, torpedoes, tethered mines, bottom mines, cables, bottom features such as rocks, outcrops, pipelines, and the bottom surface itself.

The acoustic receiver portion of an active sonar system can have a single receive element or an array of receive elements arranged in a receive array, typically formed as a line array. With this arrangement, signals provided by the receive elements can be added to provide a receive beam having a beamwidth inversely proportional to a length of the receive array. Relative time delays or relative phase shifts can be introduced to the signals provided by the receive elements to steer the receive beams about the receive array.

Sidescan imaging sonar generally uses a linear transmit array to generate sound in a narrow horizontal beam of acoustic energy, which is directed obliquely towards the seabed. Images are formed by moving this narrow transmit beam through the water and receiving echoes or scattered sound resulting from the transmitted sound.

With regard to across track image resolution, for a sidescan imaging sonar that uses a frequency modulated transmit waveform, across track resolution is determined by a bandwidth of a transmit pulse. For a sidescan imaging sonar that uses a single frequency transmit waveform transmitted as a pulse, across track resolution is determined by a length of the pulse (still related to a bandwidth of the transmission).

With regard to along track resolution, for a sidescan imaging sonar, above described receive beamforming techniques can be used to focus energy received as echoes or backscatter from the seabed or target object, resulting in an improved along track resolution. The extent to which the along track resolution can be improved with receive beamforming techniques has a fixed limit based upon the along track aperture of the receive array. Conventional sidescan sonar is limited in resolution to an angular resolution (in radians) defined by the wavelength of the sidescan sonar divided by the aperture of the receive array.

Where the receive array is a horizontal receive array disposed in a line, an azimuth width of a receive beam (related to an along track resolution) is inversely proportional to the length of the array in wavelengths. Therefore, high along track resolution can be achieved either by lengthening the receive array or by increasing the frequency of operation. However, physical array length is often limited by a size of a platform to which the receive array is attached. Furthermore, high acoustic frequencies attenuate rapidly in the water, preventing acoustic propagation to long ranges. As a result, conventional active sonar systems are limited in performance by receive array length constraints and by acoustic frequency constraints.

Synthetic aperture techniques can improve the along track resolution beyond that described above for conventional receive beamforming.

Synthetic aperture sonar (SAS) is a known processing technique that uses an array of underwater receive elements, usually disposed in a line array, to receive and combine sound resulting from successive sound transmissions or pings as the line array moves through the water.

SAS improves along track resolution of a moving active sonar system by coherently combining receive signals associated with more than one acoustic transmission or ping to synthesize a longer effective receive array, i.e., a "virtual array." With SAS processing, Nyquist sampling constraints require that the receive array advance (move along its axis) by no more than half the physical length of the receive array between successive pings. It is known that more rapid movement of the receive array results in formation of grating lobes. A variety of SAS algorithms are known.

SAS requires knowledge of, i.e. an estimate of, a spatial track (i.e., position or motion estimate) of the receive array with time, in order to be able to accurately coherently combine receive signals from the receive array. It will be understood that a spatial "track" can be associated with six degrees of freedom of motion of the receive array: three displacements and three rotations. For a flexible receive array, for example, a towed line array, spatial estimates can be difficult. For a rigid receive array, for example, as may be disposed upon an autonomous underwater vehicle (AUV), the estimates may be less difficult.

To further improve an image, an autofocus technique can automatically adjust the track estimate based on an ability of the adjustment to improve the quality of a resulting SAS image.

SAS is conventionally performed at relatively low acoustic frequencies and over large distances between the SAS and the underwater target from which echoes are received. SAS tends to be used merely to detect the presence of underwater objects and structures, e.g., submarines, mines. As described above, it is known that relatively low frequencies can provide only coarse image resolution of detected objects, and thus, conventional SAS sonar systems and methods do not lend themselves to imaging of small irregularities on an underwater surface, e.g., cracks on an underwater pipe.

It would be desirable to provide a system and method for inspecting pipes and other underwater surfaces for cracks and the like, without stopping flow of material within the pipes.

SUMMARY

The present invention provides a system and method for acoustically inspecting pipes and other underwater surfaces for cracks and the like, without stopping flow of material within the pipes.

In accordance with an example useful for understanding an aspect of the present invention, a method of inspecting an underwater surface includes projecting, from a moving underwater vehicle (UV) travelling substantially parallel to the underwater surface, at a separation distance from the underwater surface, and at a transit speed relative to the underwater surface, transmitted sound in an FM sweep toward the underwater surface. The FM sweep has a lowest frequency, a highest frequency, and a sweep time interval between the lowest frequency and the highest frequency. The lowest frequency is above about 2.0 MHz. The projecting comprises projecting the transmitted sound in a transmitting beam pattern having a beam pattern center axis. The method further includes receiving, with the underwater vehicle (UV), backscattered sound from the underwater surface responsive to the transmitted sound, wherein the receiving is performed with a plurality of receive elements having respective centers arranged in a line array with a physical aperture. The method further includes processing a plurality of signals from the plurality of receive elements with synthetic aperture processing to result in a plurality of motion compensated signals. The method further includes beamforming using the plurality of motion compensated signals to generate a beamformed signal indicative of a synthetic aperture longer than the physical aperture. The method further includes forming an image of the surface using the beamformed signal.

In accordance with another example useful for understanding another aspect of the present invention, a system for inspecting an underwater surface includes an underwater vehicle (UV) for navigating substantially parallel to the underwater surface, at a separation distance from the underwater surface, and at a transit speed relative to the underwater surface. The UV includes a transmit assembly for transmitting sound in an FM sweep toward the underwater surface. The FM sweep has a lowest frequency, a highest frequency, and a sweep time interval between the lowest frequency and the highest frequency. The lowest frequency is above about 2.0 MHz. The transmitted sound has a transmitting beam pattern having a beam pattern center axis. The UV further includes a receive assembly for receiving backscattered sound from the underwater surface responsive to the transmitted sound. The receive assembly comprises a plurality of receive elements having respective centers arranged in a line array with a physical aperture. The UV further includes an electronic memory for storing sequential digital samples representative of a plurality of signals from the plurality of receive elements. The system further includes a computer processor comprising: a synthetic aperture sonar (SAS) module for processing the stored sequential digital samples to result in a plurality of motion compensated signals; a beamforming module for using the plurality of motion compensated signals to generate a beamformed signal indicative of a synthetic aperture longer than the physical aperture; and an image generation processor for forming an image of the surface using the beamformed signal.

BRIEF DESCRIPTION OF THE DRAWINGS

The foregoing features of the invention, as well as the invention itself may be more fully understood from the following detailed description of the drawings, in which:

FIG. 3 is a table showing an example of design parameters associated with the AUV of FIG. 1;

FIG. 8 is a table showing an example of design parameters associated with the transmit element of FIG. 6;

FIG. 17 is a graph showing an example of a frequency modulated swept FM chirp that can be transmitted by the UAV of FIG. 1;

FIG. 18 is a graph showing an example of a time varying gain (TVG) that can be used in the transmit portion of the electronic circuit of FIG. 14;

FIG. 19 is a block diagram showing an example of further details of a receive portion of the electronic circuit of FIG. 14;

DETAILED DESCRIPTION

Before describing the present invention, some introductory concepts and terminology are explained.

As used herein, the term "processor" is used to describe an electronic circuit that performs a function, an operation, or a sequence of operations. The function, operation, or sequence of operations can be hard coded into the electronic circuit or soft coded by way of instructions held in a memory device. A "processor" can perform the function, operation, or sequence of operations using digital values or using analog signals.

In some embodiments, the "processor" can be embodied in an application specific integrated circuit (ASIC), which can be an analog ASIC or a digital ASIC. In some embodiments, the "processor" can be embodied in a microprocessor with associated program memory. In some embodiments, the "processor" can be embodied in a discrete electronic circuit, which can be an analog or digital.

As used herein, the term "module" is used to describe a "processor."

A processor can contain internal processors or internal modules that perform portions of the function, operation, or sequence of operations of the processor. Similarly, a module can contain internal processors or internal modules that perform portions of the function, operation, or sequence of operations of the module.

As used herein, the term "predetermined," when referring to a value or signal, is used to refer to a value or signal that is set, or fixed, in the factory at the time of manufacture, or by external means, e.g., programming, thereafter. As used herein, the term "determined," when referring to a value or signal, is used to refer to a value or signal that is identified by a circuit during operation, after manufacture.

While electronic circuit shown in figures herein may be shown in the form of analog blocks or digital blocks, it will be understood that the analog blocks can be replaced by digital blocks that perform the same or similar functions and the digital blocks can be replaced by analog blocks that perform the same or similar functions.

While an example of an underwater surface is shown and described below in the form of a surface of an underwater pipe, it should be understood that the same system and techniques can be used to provide images of any underwater surface, for example, a surface of a ship hull.

As used herein, the term "unmanned underwater vehicle" (UUV) is used to describe any vehicle that is operable underwater without a human occupant, i.e., both an AUV and an ROV.

As used herein, the term "underwater vehicle" (UV) is used to describe any vehicle that is operable underwater with or without a human occupant, i.e., both an AUV and an ROV and also a manned submarine.

While an autonomous underwater vehicle (AUV) is shown in examples below, in other embodiments, a remotely operated vehicle (ROV), a form of UUV, can be used. Also, any UUV or any UV can be used.

Figure 1:
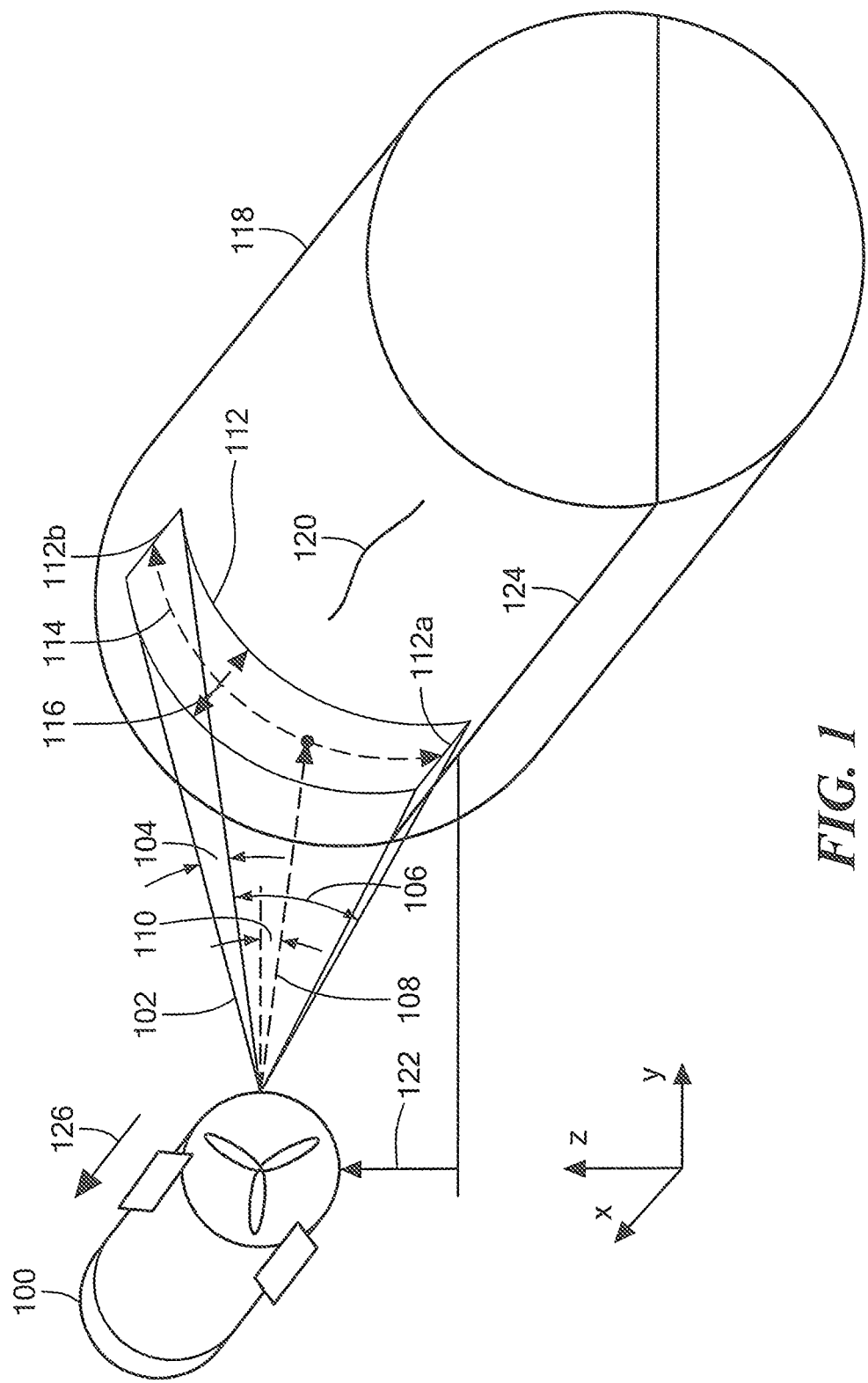
FIG. 1 is a pictorial showing an example of an autonomous underwater vehicle (AUV) travelling proximate to an underwater pipe.

Referring to FIG. 1, an autonomous underwater vehicle 100 (AUV) is shown to be traveling in a direction 126 parallel to a longitudinal axis of an underwater pipe 118. The underwater pipe 118 can be entirely above or partially below a surface 124 of the ocean bottom.

The AUV 100 travels at a height 122 above the ocean bottom 124 and with a transit speed relative to the underwater pipe 118 along an x-axis. The AUV 100 can travel at a distance from the underwater pipe 118.

The AUV 100 can transmit sound toward the underwater pipe 118 and can receive sound in a receive beam pattern 102 typified by a horizontal beam angle 104 and a vertical beam angle 106. The receive beam pattern 102 can have a center axis 108 having an angle 110 from horizontal. The angle 110 can be downward or upward. The angle 110 can also be zero degrees. For purposes of discussion herein, distance from the AUV 100 to the underwater pipe 118 is identified as the distance along the center axis 108.

Sound received in the receive beam pattern 102 can be received from a surface portion 112 having an along track (cross range) width 116 and a cross track (along range) width 114. The surface portion 112 has a closest edge 112a closest to the AUV 100 and a farthest edge 112b farthest from the AUV 100.

It will be understood from discussion above that images formed from receive signals received from the surface 112 can have an along track resolution related to the along track width 116. It will also be understood from discussion above that images formed from receive signals received from the surface 112 can have a cross track resolution related to characteristics (e.g., bandwidth) of the transmit signal that is transmitted from the AUV 100 toward the pipe 118. Transmit signal characteristics are described below.

The underwater pipe 118 can have a crack 120. It would be desirable for images generated using the receive beam 102 have sufficient resolution to identify the crack 120 with a crack width of less than one millimeter.

Relative dimensions shown in FIG. 1 are not intended to represent a limiting arrangement. For example, a diameter of the AUV 100 can be in a range of about 0.3 meters to about one meter, a diameter of the pipe 118 can be in a range of about 0.2 meters to about two meters, and a distance from the AUV 100 to the pipe 118 can be in a range of about two meters to about ten meters. Other dimensions are also possible. Furthermore, in other arrangements, the AUV 100 can project sound upon a different underwater surface, for example, a ship's hull.

Figure 2:
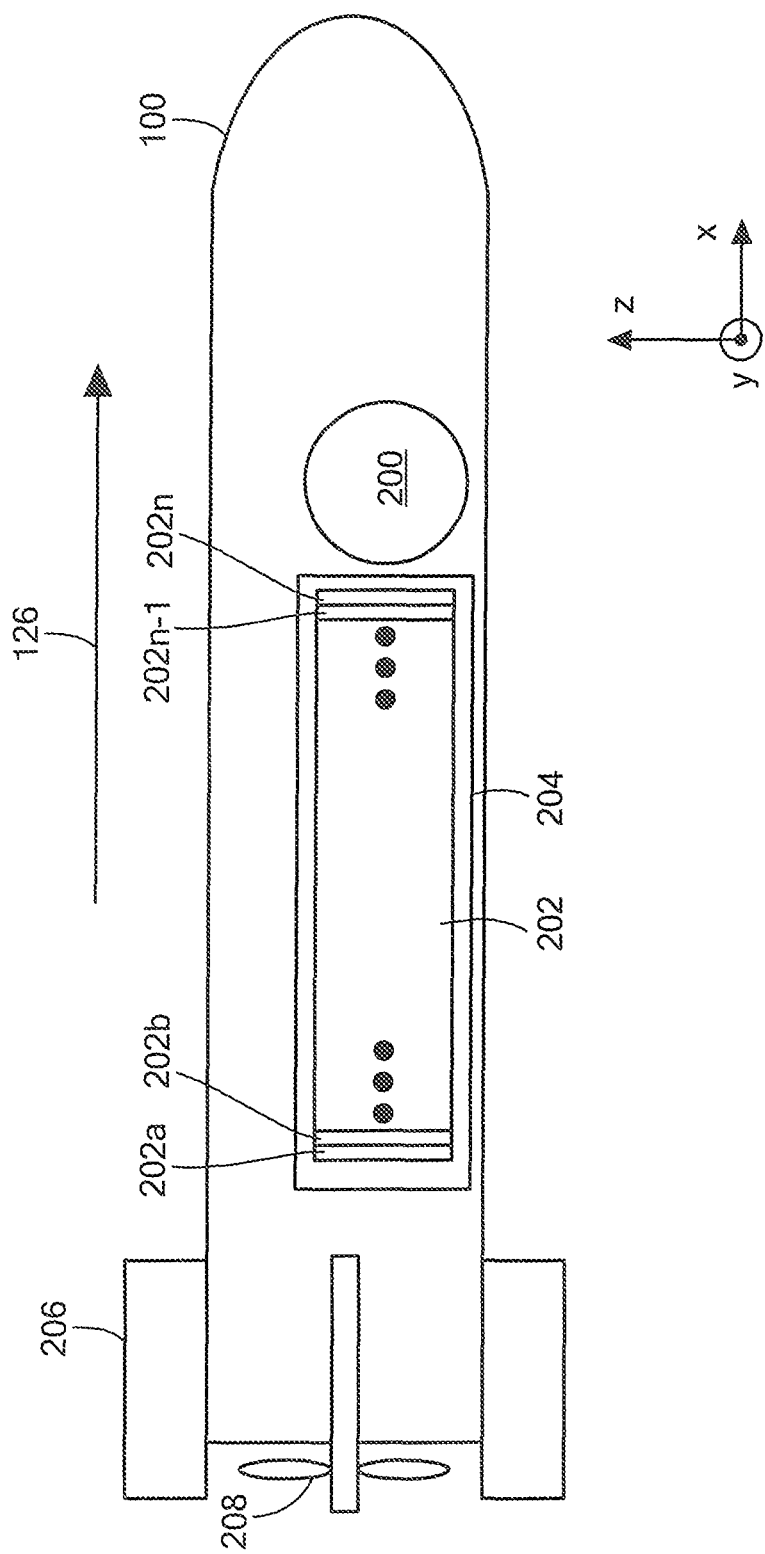
FIG. 2 is a pictorial showing an example of an acoustic transmit assembly, an acoustic receive assembly, and an electronic assembly disposed on a side of the AUV of FIG. 1.

Referring now to FIG. 2, in which like elements of FIG. 1 are shown having like reference designations, the AUV 100 can include a transmit assembly 200 operable to transmit sound toward the underwater pipe 118 of FIG. 1. An example of a transmit assembly is described more fully below in conjunction with FIGS. 6, 7, 8, and 9. Let it suffice here to say that the transmit assembly 200 can have physical characteristics that result in the sound transmitted toward the underwater pipe 118 being transmitted with a transmit beamwidth directed toward the underwater pipe 118, without the use of multiple individual transmit elements. However, it should be understood that, in other embodiments, multiple transmit elements can be used to achieve a transmit beamwidth.

The AUV 100 can also include a receive assembly 202 having a plurality of individual receive elements, e.g., 202a, 202b . . . 202n-1, 202n. In some embodiments, there are forty receive elements. An example of a receive assembly is described more fully below in conjunction with FIGS. 10, 11, 12, and 13. Each one of the receive elements 202a, 202b . . . 202n-1, 202n can have physical characteristics that result in each one of the receive elements 202a, 202b . . . 202n-1, 202n having a receive beam pattern when taken alone. In addition, receive beamforming can be used to further direct a receive beam pattern. The beam pattern 102 of FIG. 1 is intended to represent a receive beam pattern after receive beamforming.

The AUV 100 can also include an electronic assembly 204 comprised of a pressure vessel enclosing an electronic circuit described below in conjunction with FIG. 14. The electronic assembly 204 can be electrically coupled to the transmit assembly 200 and to the receive assembly 202 with the underwater cables or the like.

The AUV 100 can also include conventional elements (not shown), for example, an inertial measurement unit (IMU) (not shown), operable to guide the AUV 100 on a preprogrammed track, for example, parallel to an axis of the underwater pipe 118, and at a fixed distance from the underwater pipe 118. Accordingly, the AUV 100 can also include one or more control surfaces, e.g., 206, coupled to the inertial measurement unit. The AUV 100 can also include an internal power source (not shown), for example, batteries. The AUV 100 can also include an electric motor (not shown) coupled to the power source and coupled to a propeller 208. Other conventional elements can also be disposed within the AUV 100.

Referring now to FIG. 3, a table indicates useful and goal parameter values associated with the AUV 100 of FIGS. 1 and 2. The useful parameter values are described below, but the AUV 100 can also be operable having the listed goal parameter values, or any parameter values between the useful and goal parameter values.

The AUV 100 can be operable to transmit and receive sound in a frequency range of about 3.5 to about 5.0 MHz, for example, in FM sweeps or chirps. Accordingly, the AUV 100 can be operable in a bandwidth of about 1.5 MHZ, with a center frequency of about 4.25 MHz. This range of frequencies and bandwidth will be recognized to be a very high range of frequencies and bandwidth for underwater sound, subject of very high levels of sound absorption by seawater described more fully below. A wavelength at 4.25 MHz is about 0.35 millimeters.

The electronic assembly 204, the transmit assembly 200, and the receive assembly 202 of FIG. 2 can be operable to consume less than one hundred Watts of power.

The electronic assembly 204 can have an electronic memory therein capable of recording receive signals from the receive array for at least two hours. However, in embodiments described in conjunction with FIG. 14, a recording length of about three hours is described.

A range (distance between the AUV 100 and the underwater pipe 118) can be at least 4.57 meters.

The electronic assembly 204, the transmit assembly 200, and the receive assembly 202 of FIG. 2 can have a combined weight in weight of less than 4.53 kilograms.

The receive assembly 202 can have forty receive elements.

A length of each receive element in the receive assembly 202 in the along track (cross range) direction can be less than about two millimeters. This will be understood to be a very small length for sonar systems.

A cross range (along track) and the range (cross track) resolution of images resulting from the AUV 100 can both be less than one millimeter. This will be understood to be a very high degree of resolution suitable for detecting cracks in the underwater pipe.

A source level of the transmit assembly 204 of FIG. 2 can be about 191 dB re 1 uPa.

A receive sensitivity of each receive element in the receive assembly can be about −224 dB in volts per uPa.

A reflected noise level of the electronic assembly 204 and the receive assembly 202 can be about 55 dB re 1 uPa.

A pulse length of sound transmitted by the transmit assembly 200 can be about ten milliseconds as the above-described FM chirp. In essence, the transmit assembly 200 can transmit sound into the water that periodically sweeps from a lowest frequency, e.g., 3.5 MHz, to a highest frequency, e.g., 5.0 MHz, or vice versa.

A ping rate interval, i.e., a repetition period of the above described FM chirps, can be about twelve milliseconds, leaving about two milliseconds between FM chirps.

An operational transit speed of the AUV 100 can be about 1.028 meters per second.

The above parameter values result in the AUV 100 advancing about 1.233 centimeters from FM chirp to FM chirp.

Less than fifteen overlapping phase centers can be used in SAS processing described below.

Figure 4:
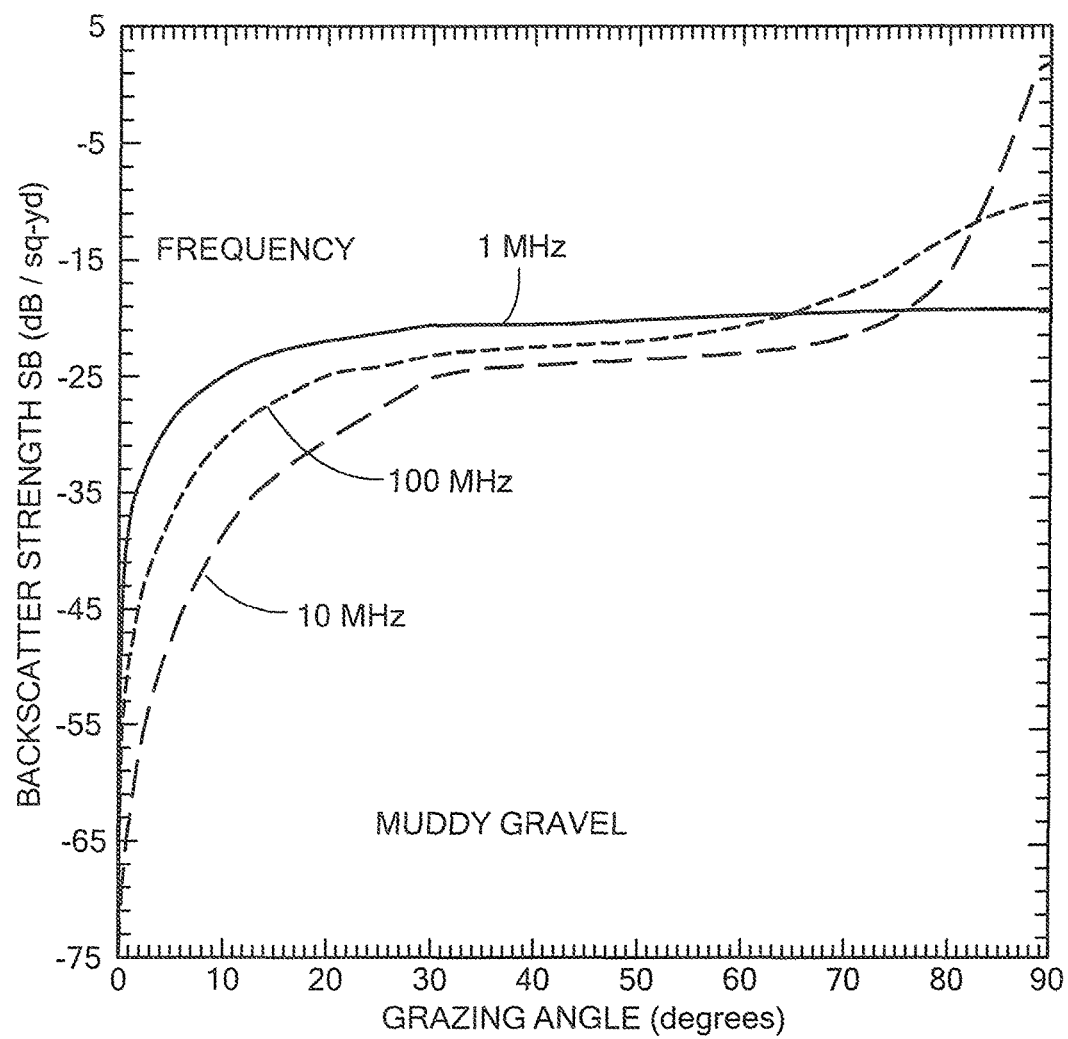
FIG. 4 is a graph showing backscattering strength versus grazing angle for an ocean bottom made of muddy gravel.

Referring now to FIG. 4, a graph has a horizontal axis in units of grazing angle of sound impacting an ocean bottom. The graph also has a vertical axis with units if dB per square yard of sound backscattered form an ocean bottom consisting of muddy gravel. Three curves show levels of backscattered sound versus grazing angle for three different sound frequencies. For grazing angles from about twenty degrees to about seventy degrees, backscattered sound at about one MHz has a backscattering strength of about negative twenty-four dB per square yard. However, at other frequencies, including higher and lower frequencies, and for other bottom types, backscattering strength can be different in magnitude and in shape versus grazing angle.

Figure 5:
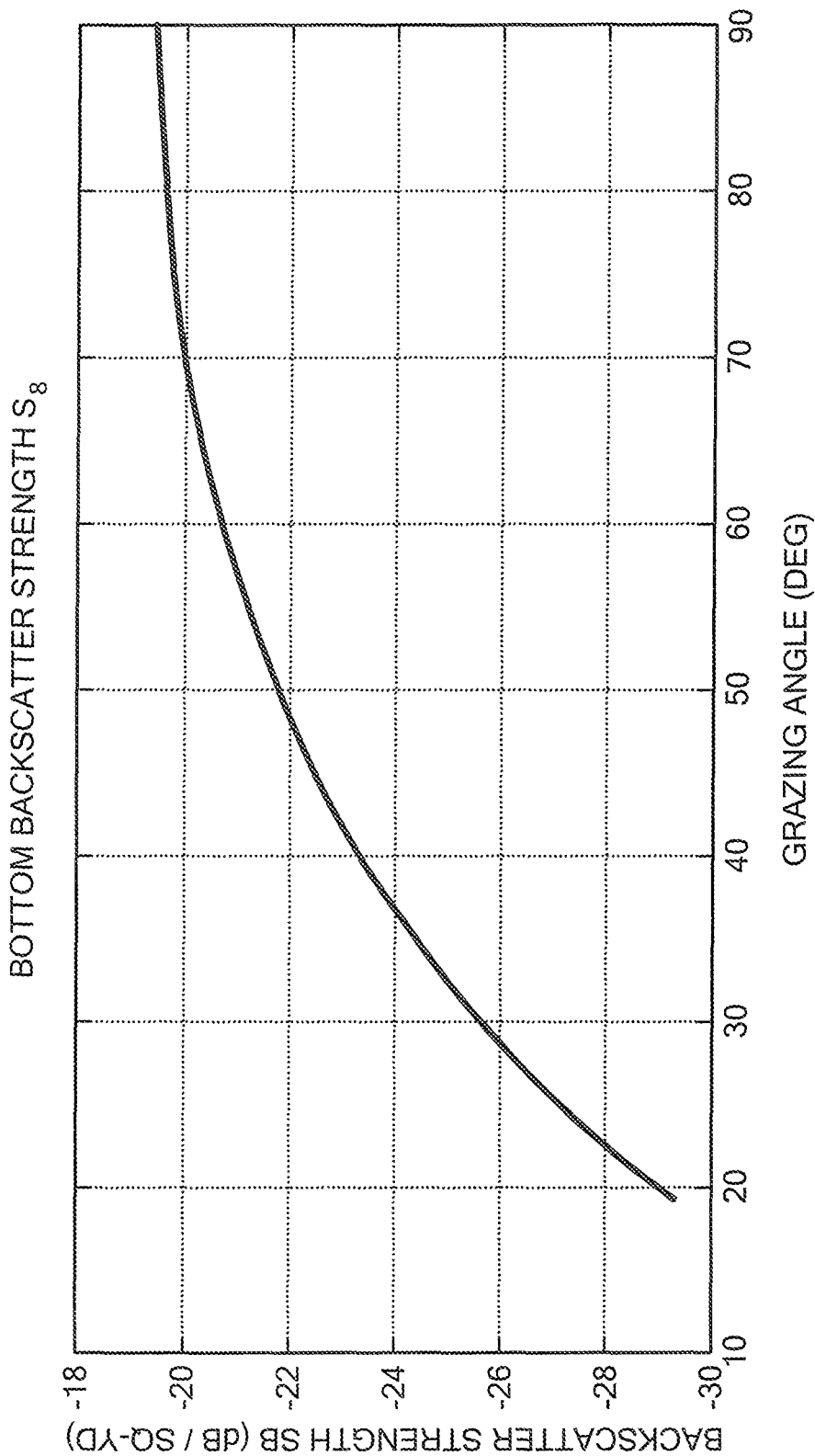
FIG. 5 is a graph showing an example of backscattering strength versus grazing angle that may be expected for the AUV of FIG. 1 when operating with the parameters listed in FIG. 3.

Referring now to FIG. 5, a graph has a horizontal axis in units of grazing angle of sound impacting an ocean bottom. The graph also has a vertical axis with units if dB per square yard of sound backscattered form an ocean bottom consisting of medium sand. A curve shows levels of backscattered sound versus grazing angle at a frequency of about 4 MHz. For grazing angles from about twenty degrees to about seventy degrees, backscattered varies from about negative twenty-eight dB per square yard to about negative twenty dB per square yard. However, at other frequencies, including higher and lower frequencies, and for other bottom types, backscattering strength can be different in magnitude and in shape versus grazing angle.

Figure 6:
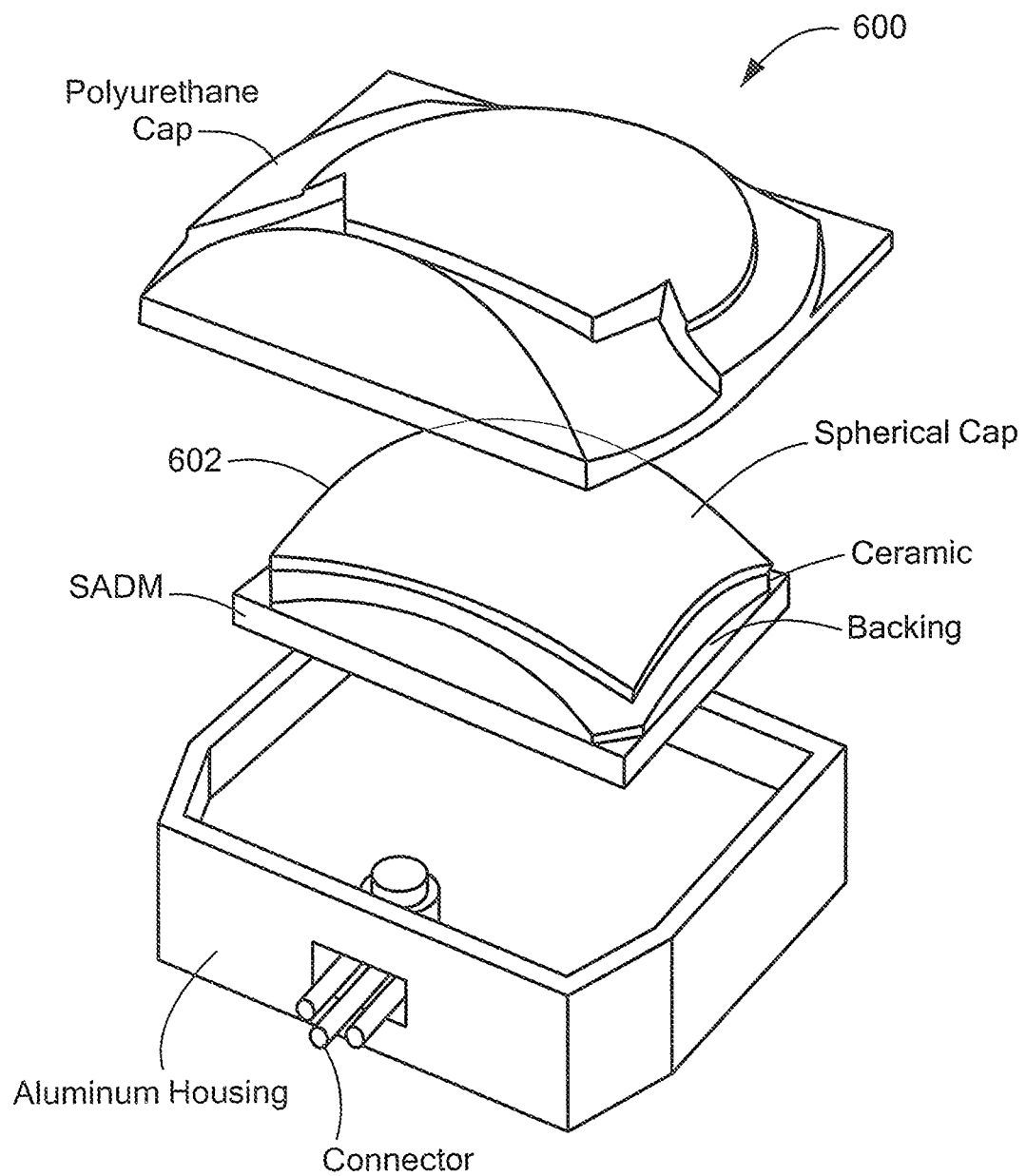
FIG. 6 is an exploded view of an example of a transmit assembly that can be used as the transmit assembly shown in FIG. 2.

The graphs of FIGS. 5 and 6 can be used to predict sound backscattering strength for sound impinging upon an underwater pipe or other surface.

Referring now to FIG. 6, a transmit assembly 600 can be the same as or similar to the transmit assembly 200 of FIG. 2.

The transmit assembly 600 can include an aluminum housing with a waterproof connector passing through.

The transmit assembly 600 can include a transmit element 602 having a backing, a ceramic element, and a spherical cap, all having a partially spherical shape. The backing can be, or can be used in conjunction with, a syntactic acoustic dampening material (SADM). A cap, for example, a polyurethane cap can be disposed over the acoustic assembly and sealed to the aluminum housing.

Figure 7:
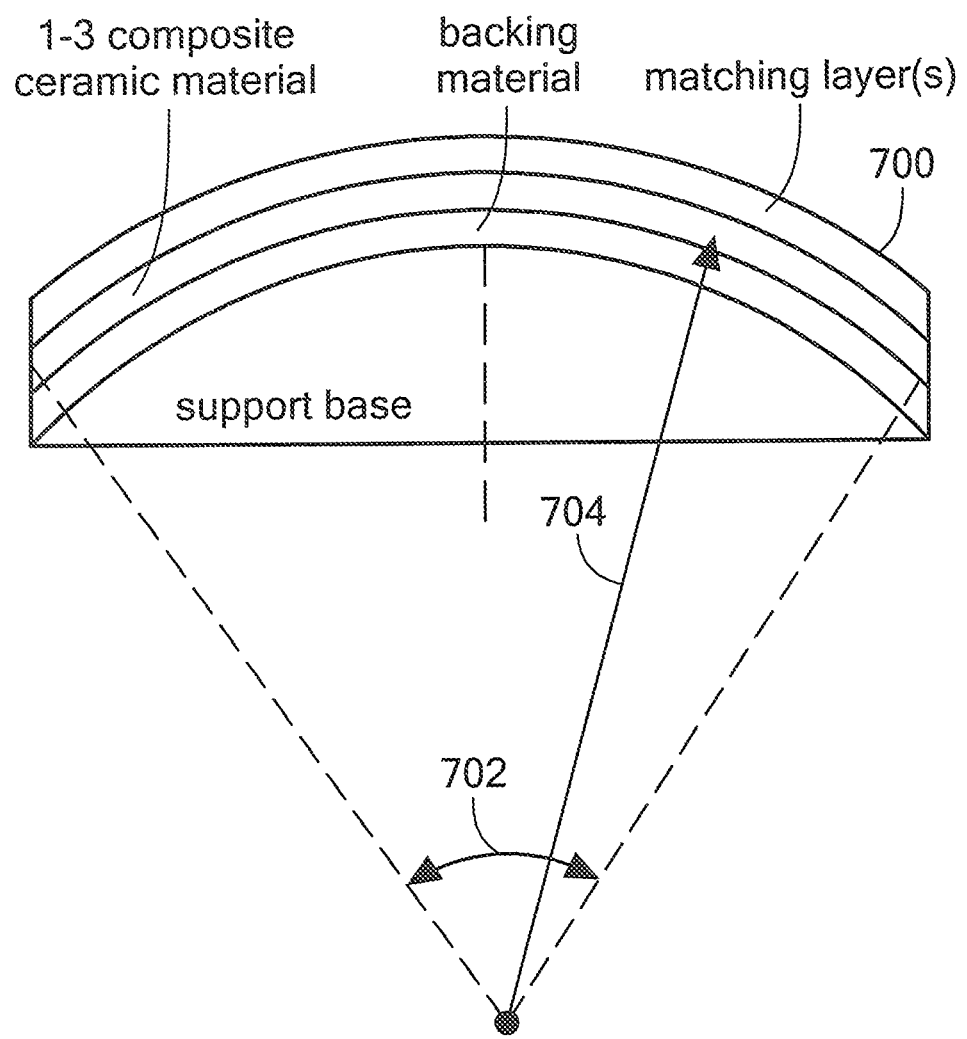
FIG. 7 is a cross section of an example of a transmit element within the transmit assembly of FIG. 6.

Referring now to FIG. 7, a transmit element 700 can be the same as or similar to the transmit element 602 of FIG. 6.

The transmit element 700 can include a support base, a backing material layer disposed over the support base, a piezoelectric 1-3 composite ceramic material layer disposed over the backing material layer, and a matching material layer disposed over the piezoelectric 1-3 composite ceramic material layer.

The transmit element 700 can have a spherical radius of curvature 704 and a three dimensional opening angle 702.

Some further characteristics of the layers are described below in conjunction with FIG. 8.

Referring now to FIG. 8, some characteristics of the transmit element 700 of FIG. 7 are shown. In particular, a thickness of the ceramic material layer can be about 0.4572 mm. The opening angle 702 of FIG. 7 can be about sixty degrees. The dielectric constant of the ceramic material layer can be about six hundred (PZT-4).

Not shown, sound speed in the ceramic material layer can be about 4000 meters per second, density of the ceramic material layer can be about 5300 kg per cubic meter, and the piezoelectric coupling (k33) can be about 0.7.

Figure 9:
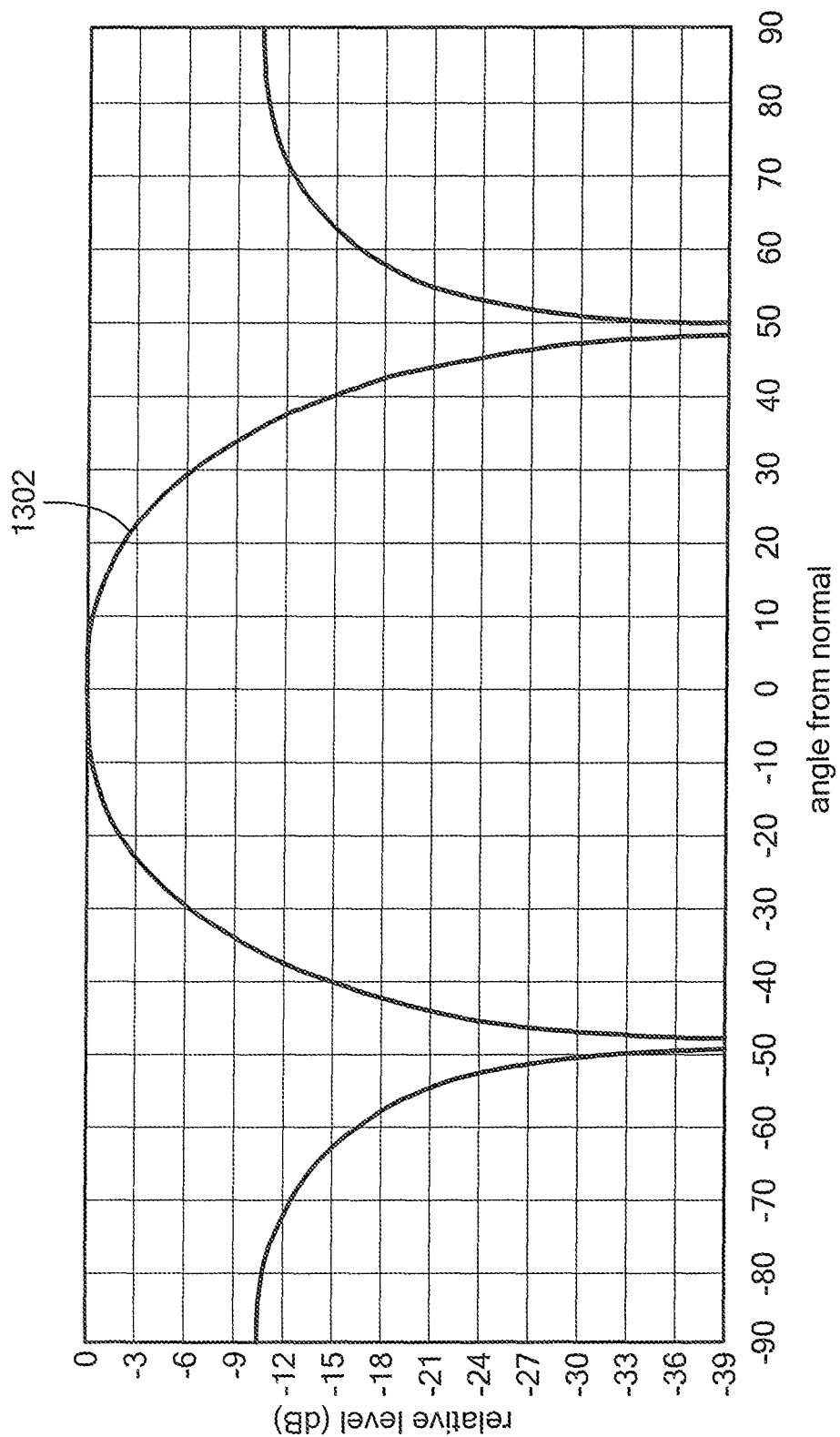
FIG. 9 is a graph showing an example of a beam pattern of the transmit assembly and transmit element of FIGS. 2, 6, 7, and 8.

Referring now to FIG. 9, a graph has a horizontal axis with a scale in units of angle from perpendicular relative to the transmit assembly 200, 600 of FIGS. 2 and 6, respectively. The graph also has a vertical axis with a scale in units of relative level in decibels. A curve 1302 is representative of both a vertical and horizontal beam pattern (symmetrical) of the above-described transmit assembly 200, 600 at 4.25 MHz. As indicated, the transmit assembly 200, 600 can have a beamwidth (−3 dB beamwidth) of about forty degrees. A transmit beam pattern is not shown in FIG. 1. However, it will be understood that the center (MRA) or the transmit beam pattern can be directed along the center axis 1208 of the receive beam pattern 102.

Figure 10:
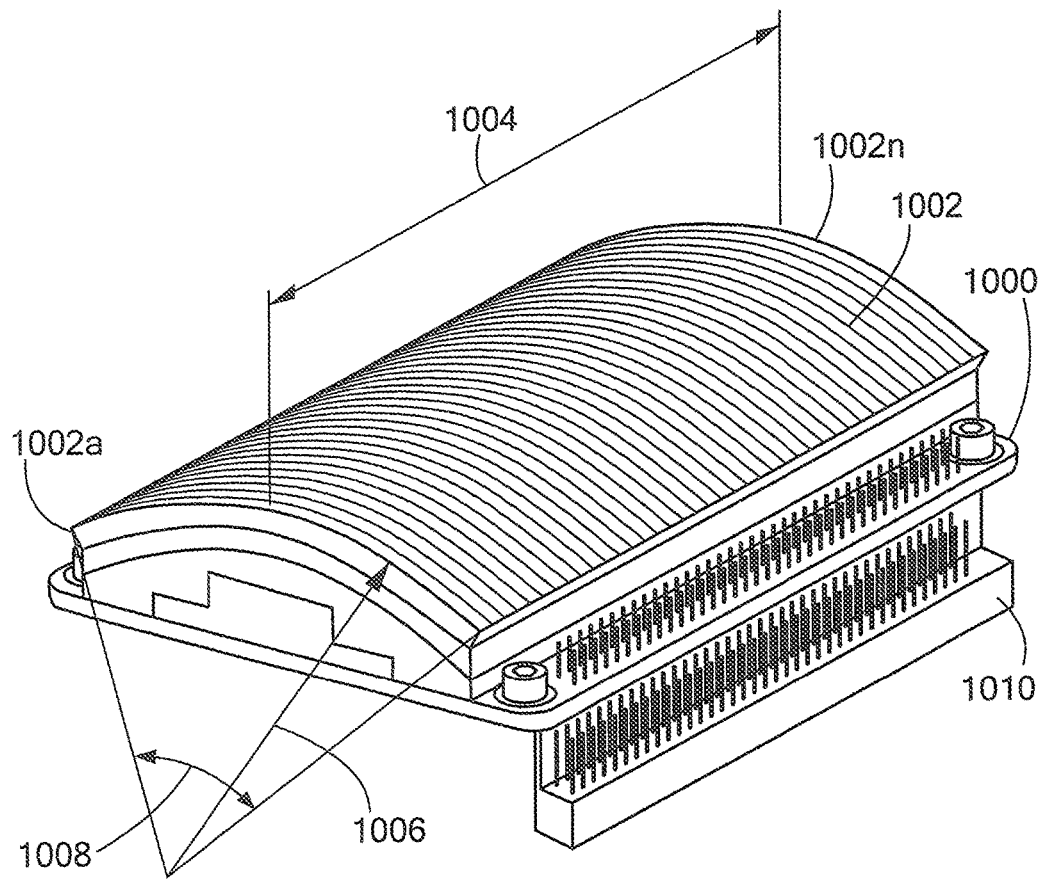
FIG. 10 is pictorial showing an example of a receive assembly that can be used as the as the receive assembly of FIG. 2.

Referring now to FIG. 10, a receive assembly 1000 can be the same as or similar to the receive assembly 202 of FIG. 2. The receive assembly 1000 can include a receive array 1002 having individual receive element 1002a-1002n. In some embodiments, there are about forty receive elements 1002a-1002n, each having a radius of curvature 1006 of about 1.5 inches or about 3.81 centimeters.

The receive array 1002 can have a length 1004 of about 1.57 inches or about four centimeter and an opening angle 1008 of about sixty degrees.

Figures 11, 12:
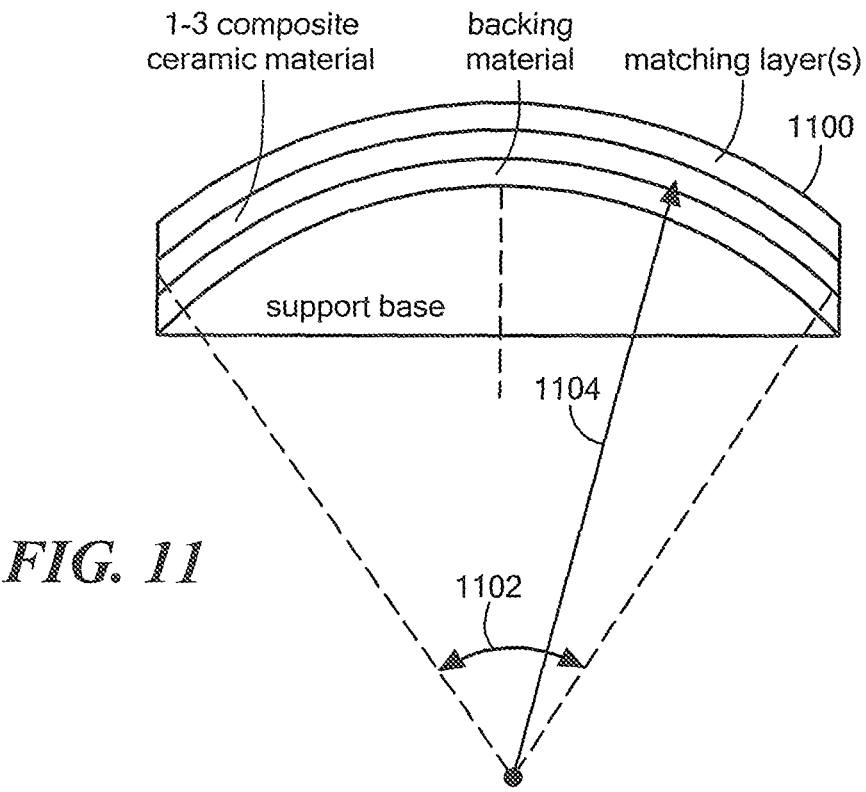
FIG. 11 is a cross section of an example of a receive element within the receive array of FIG. 10.
FIG. 12 is a table showing an example of design parameters associated with the receive element of FIG. 11.

The receive assembly 1000 can include a connector 1010 allowing electrical connection to each one of the receive elements 1002a-1002n Referring now to FIG. 11, a receive element 1100 can be the same as or similar to one of the receive elements 1002a-1002n of FIG. 10.

The receive element 1100 can include a support base, a backing material layer disposed over the support base, a piezoelectric 1-3 composite ceramic material layer disposed over the backing material layer, and a matching material layer disposed over the piezoelectric 1-3 composite ceramic material layer.

The receive element 1100 can have a round radius of curvature 1104 and a two dimensional opening angle 1102. Some further characteristics of the layers are described below in conjunction with FIG. 12.

Referring now to FIG. 12, some characteristics of the receive element 1100 of FIG. 11 and of the receive array 1002 of FIG. 10 are shown. In particular, the length 1104 of the receive array 1002 can be about 1.57 inches (about 4.0 centimeters), the number of receive elements 1002a-1002n can be about forty, a kerf of a receive element 1002a-1002n can be about 0.005 inches (about 0.127 mm), a gap between receive elements 1002a-1002n can be about 0.005 inches (about 0.127 mm), an element length (along receive array axis) can be about 0.0345 inches (about 0.876175 mm), a center-to-center (ctc) spacing between receive elements 1002a-1002n can be about 0.0395 inches (about 1.003175 mm), Not shown, sound speed in the ceramic material layer can be about 4000 meters per second, density of the ceramic material layer can be about 5300 kg per cubic meter, and the piezoelectric coupling (k33) can be about 0.7.

Figure 13:
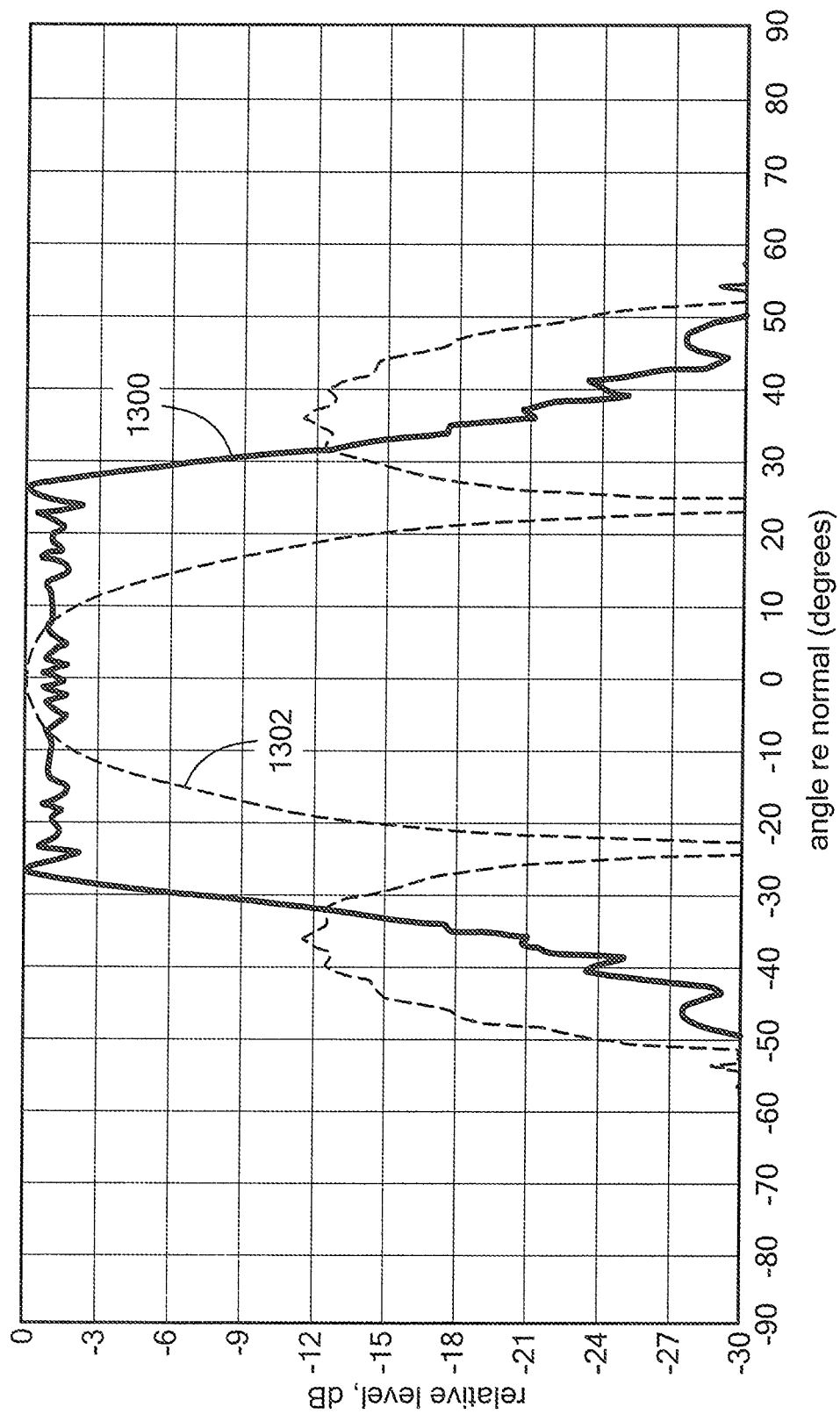
FIG. 13 is a graph showing an example of a horizontal and a vertical beam pattern of the receive element of FIG. 11.

Referring now to FIG. 13, a graph has a horizontal axis with a scale in units of angle from perpendicular relative to the receive assembly 202, 1002 of FIGS. 2 and 10, respectively. The graph also has a vertical axis with a scale in units of relative level in decibels. A curve 1300 is representative of a vertical beam pattern and a curve 1302 is representative of a horizontal beam pattern of one of the above-described receive elements, e.g., 1002a-1002n of FIG. 10 at 4.25 MHz. As indicated, the receive element can have a horizontal beamwidth (−3 dB beamwidth) of about twenty degrees and a vertical beamwidth of about eighty degrees.

In reference to an individual receive element arranged as in the receive assembly 202 of FIG. 2, the horizontal beamwidth of an individual receive element is in a direction of the vertical beamwidth 106 of FIG. 1, and the horizontal beamwidth of an individual receive element is in a direction of the horizontal beamwidth 104 of FIG. 1. In essence, receive beamforming with or without SAS processing causes the horizontal beam angle 104 of FIG. 1 to be reduced in angular width from the vertical beam pattern 1300 of the individual receive elements. The resulting horizontal beam angle 104 is indicative of the 0.5 mm cross range (along track) resolution described above in conjunction with FIG. 3.

Figure 14:
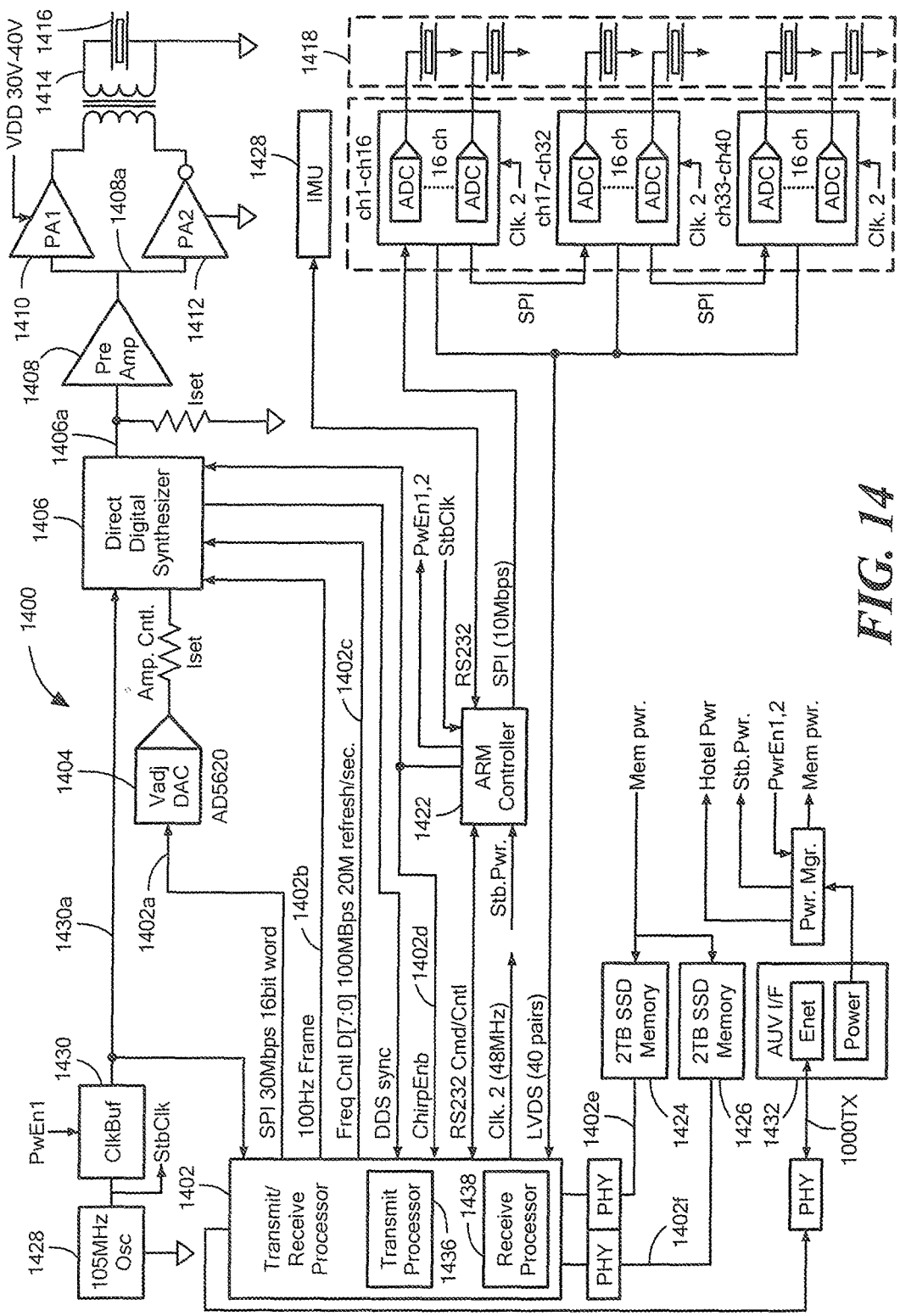
FIG. 14 is a block diagram showing an example of an electronic circuit that can be used within the electronic assembly of FIG. 2.

Referring now to FIG. 14, an electronic circuit 1400 can be the same as or similar to the above-mentioned electronic circuit within the electronic assembly 204 of FIG. 2. Some parts of FIG. 14 are not a part of the electronic circuit 1400, but are shown for clarity. In particular, a transmit assembly 1416, a receive assembly 1418, an inertial measurement unit (IMU) 1428, and a power source 1432 are not a part of the electronic circuit 1400 housed within the electronic assembly 204 of FIG. 2. It will be apparent that the transmit assembly 1416 and the receive assembly 1418 can be the same as or similar to the transmit assembly 200 and the receive assembly 202 of FIG. 2, coupled to the electronic assembly 204 with cables or the like. The inertial measurement unit (IMU) 1428 and the power source 1432 can be part of the AUV of FIG. 2, but are not shown in FIG. 2.

The electronic circuit 1400 can include a transmit/receive processor 1402 having a transmit processor 1436 and a receive processor 1438, examples of which are described below. The transmit processor 1436 can generate control signals 1402a, 1402b, 1402c, 1402d, 1402e operable to control a direct digital synthesizer (DDS) 1406. In some embodiments, the DDC 1406 is a part number AD9850 by Analog Devices, Inc. of Massachusetts. The control signals 1402a, 1402b, 1402c, 1402d, 1402e are described more fully below in conjunction with FIG. 15. Let it suffice here to say that the control signals 1402a, 1402b, 1402c, 1402d, 1402e are operable to cause the DDS 1406 to generate a swept frequency modulated signal 1406a having a lowest frequency, a highest frequency, and a period between FM sweeps. The swept frequency modulated signal 1406a is described more fully below in conjunction with FIG. 17.

A preamplifier 1408 is coupled to receive the signal 1406a and configured to generate an amplified signal 1408a. Power amplifiers 1410, 1412 are coupled to receive the amplified signal 1408a and configured to generate respective power signals received by a transformer 1414. The transformer 1414 can be coupled to the transmit assembly 1416. Accordingly, the transmit assembly 1416 is operable to transmit into the water an FM acoustic signal having the lowest frequency, the highest frequency, and the period between FM sweeps.

Analog-to-digital converters (ADCs) 1420 are coupled to the receive assembly 1418. In some embodiments, preamplifiers (not shown) are coupled between the receive assembly 1418 and the analog-to-digital converters 1420. The analog-to-digital converters 1420 are operable to generate a signal 1420a indicative of acoustic signals received by individual receive elements within the receive assembly 1416. As described above, in some embodiments receive assemblies described herein can include forty receive elements. The signal 1420a can be a serial digital signal having information associated with forty receive elements, or, in other embodiments, the signal 1420a can be a parallel digital signal having information associated with forty receive elements.

In some embodiments, within the signal 1420a, each one of the analog to digital converters 1420 has a sixteen bit output sampled at about forty-eight megabytes per second, or seven hundred sixty eight megabits per second.

The receive processor 1438 can be coupled to receive the signal 1420a. The receive processor 1438 can perform a variety of preprocessing upon the signal 1420a, an example of which is described below in conjunction with FIG. 19, and can generate one or more channels of, here two channels of, a preprocessed signal 1402e, 1402f for storage in a memory 1424, 1426 within the electronic assembly 204 of FIG. 2.

In some embodiments, the memory 1424, 1426 can be about four Terabytes in size. The preprocessing can result in the preprocessed signals 1402e, 1402f having six byte (e.g., twenty-four bit) samples] at a byte rate of 1.5 megabytes per second for each of forty channels, resulting in three hundred sixty megabytes per second. The memories can be written to sequentially, so that the signal 1420f becomes active only when the memory 1424 is full. In other embodiments, the memory writes ping pong back and for the between the two memories 1424, 1426.

Using the above rates, a four terabyte (4 TB) memory can hold 4 TB/360 MBps=about three hours of data.

An ARM (or advanced reduced instruction set computer (RISC)) controller 1422 can be coupled to receive position and location information from the inertial measurement unit 1428 and to merge such information into the signal 1420a, so that information from the receive assembly 1418 can be tagged with position information. In some embodiments, the position information includes three-axis magnetic information, three-axis acceleration information, and three-axis gyro information. Position information can also be merged into the signals 1420a, 1420f, resulting in slightly higher bit rates and slightly less memory duration, but the data rate for navigation is a very slight overhead, for example, a few kBytes per second. Time stamp information can also be inserted into the signal 1420a.

Boxes labels PHY are indicative of a physical layer interface, e.g., an Ethernet interface, that provides a mechanism for downloading data from the vehicle at the end of a mission. Data can be processed, for example, by a computer processor 2001 described below in conjunction with FIG. 20.

Figure 15:
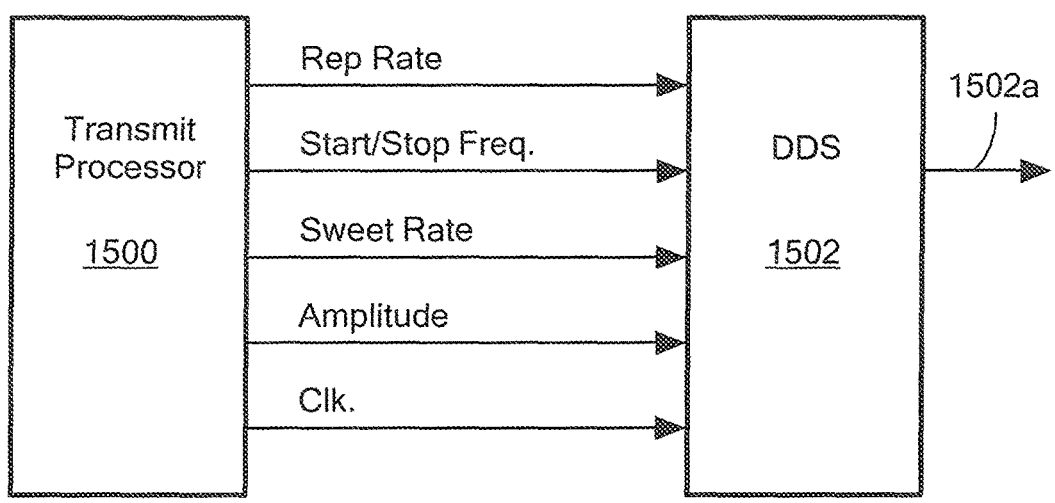
FIG. 15 is a block diagram showing an example of further details of a transmit portion of the electronic circuit of FIG. 14.

Referring now to FIG. 15, a part of a transmit processor 1500 can be within the transmit processor 1436 FIG. 14. The transmit processor 1500 can be coupled to a DDS 1502, which can be the same as or similar to the DDS 1406 of FIG. 14.

As described above in conjunction with FIG. 14, the transmit processor 1500 is configured to generate four control signals received by the DDS 1406, and the DDS 1406 also receives a clock signal 1430a.

As described above in conjunction with FIG. 14, and as described below in conjunction with FIG. 17, the DDS 1502 is operable to generate a swept frequency signal 1502a that periodically sweeps in frequency from a lowest frequency to a highest frequency. To this end, the transmit processor 1500 provides a repetition rate signal indicative of the periodic rate of sweeps of the swept frequency signal 1502a, a start/stop frequency signal indicative of the lowest and highest frequencies of the swept frequency signal 1502a, a sweep rate signal indicative of a frequency rate of the sweeps of the swept frequency signal 1502a, an amplitude signal indicative of an amplitude of the swept frequency signal 1502a, and a clock signal. The amplitude signal can provide an amplitude modulation (e.g., linear sweep of amplitude) of the transmitted pulse to provide some pre-emphasis of the transmit waveform to improve the dynamic range performance of the receiver. An example of such amplitude modulation is shown below in conjunction with FIG. 18. However, the amplitude modulation is optional.

It should be recognized that the amplitude signal can result in the swept frequency signal 1502a that does not have constant amplitude at all frequencies as the frequency sweep progresses.

Figure 16:
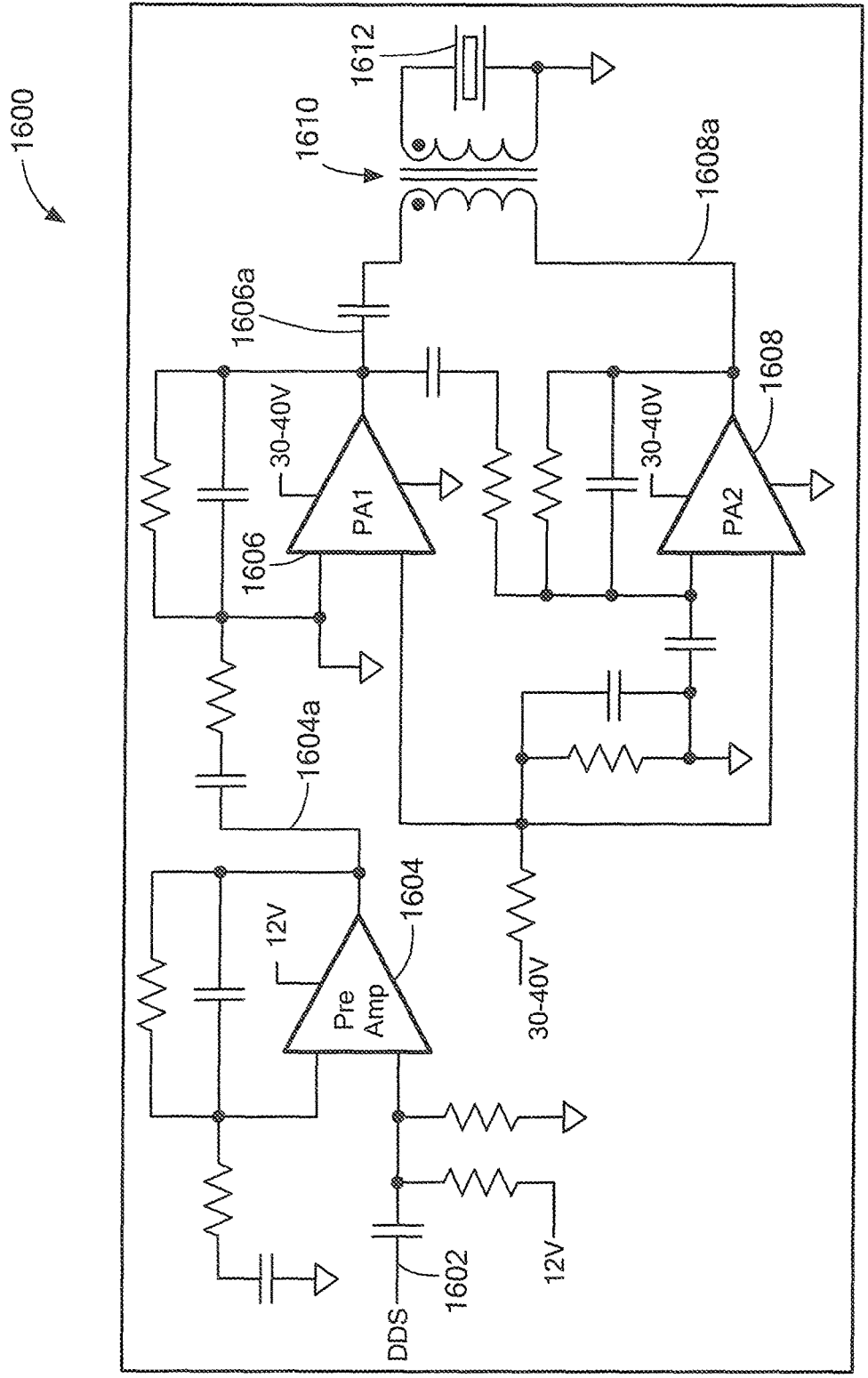
FIG. 16 is a block diagram showing an example of additional details of the transmit portion of the electronic circuit of FIG. 14.

Referring now to FIG. 16, a preamplifier 1604 can be the same as or similar to the preamplifier one 1408 of FIG. 14, a power amplifier 1606 can be the same as or similar to the power amplifier 1410 of FIG. 14, a power amplifier 1608 can be the same as or similar to the power amplifier 1412 of FIG. 14, a transformer 1610 can be the same as or similar to the transformer 1414 of FIG. 14, and a transmit assembly 1612 can be the same as or similar to the transmit assembly 1416 of FIG. 14.

As shown, the preamplifier can be arranged with resistors and capacitors to provide a filtering function, for example, a bandpass filtering function, as well as an amplification function. Similarly, the power amplifiers 1606, 1608 can be arranged with resistors and capacitors to provide respective filtering functions, for example, bandpass filtering functions. In some embodiments, all of the bandpass filtering functions have lower corner frequency below about 3.5 MHz and upper corner frequency above about 5.0 MHz.

Referring now to FIG. 17, a graph has a horizontal axis with a scale in units of time, and a vertical axis with a scale in units of frequency. A curve 1700 has periodic ramping portions 1702a, 1702b indicative of an FM chirp signal (e.g., swept frequency signal 1502a) that ramps in frequency from a lowest frequency of about 3.5 MHz to a highest frequency of about 5.0 MHz. Portions 1704a, 1704b are indicative of the FM chirp signal having no signal content, i.e., having an amplitude of essentially zero.

In some embodiments, the periodic ramping portions 1702a, 1702b have durations of about ten ms. In some embodiments, the portions 1704a, 1704b have durations of about 2.5 ms. It should be understood that a ten ms acoustic transmission in the water occupies about fifteen meters distance in the water. Thus, referring to FIG. 3, for a distance of about 4.57 meters (see FIG. 3) between the AUV 100 of FIG. 1 and the underwater pipe 118, the sound in the water will extend from the AUV 100 to the underwater pipe 118, extend as an echo back to the AUV 100, and thus occupying the entire space between the AUV 100 of FIG. 1 and the underwater pipe 118, traveling in two directions between the AUV 100 and the underwater pipe.

In some embodiments, the portions 1704a, 1704b are not used and instead the ramping portions 1702a, 1702b are contiguous.

In other embodiments, ramping portions with other start and/or stop frequencies, and/or with other periodic durations, and/or with other frequency rates can be used.

Referring now to FIG. 18, a graph has a horizontal axis with units of time and a vertical axis with units of gain in dB. A curve 1800 has periodic ramping portions 1802a, 1802b and also portions 1804a, 1804b between the ramping portions. The ramping portions 1802a, 1802b can match the portions 1702a, 1702b of FIG. 17 in duration, i.e. about ten ms. Similarly, the portions 1804a, 1804b can have the same durations as the portions 1704a, 1704b of FIG. 17, i.e., about 2.5 ms.

The curve 1800 is representative of a gain or emphasis that can be applied to the signal 1700 of FIG. 17, for example, by the voltage adjustment DAC 1404 of FIG. 14. Thus, the signal 1700 can have different amplitudes at different frequencies. The different amplitudes at different frequencies can be used to compensate for characteristics of the transmit assembly 1416 of FIG. 14, for example, to compensate for different transmit responses at different frequencies. The different amplitudes at different frequencies can also be used to compensate in part for different absorptions at different frequencies that sound experiences in the water. Sound absorption is described more fully below in conjunction with FIGS. 21 and 22.

Referring now to FIG. 19, a part of a receive processor 1900 can be within the receive processor 1438 of FIG. 14. The part of the receive processor 1900 can include a number of channels the same as the number of receive elements within the receive assembly 1418 of FIG. 14. An example of forty channels (forty receive elements) has been used above and is used again here.

Taking an element 1 channel as begin representative of the other channels, the element 1 channel can be coupled to receive a signal 1906 as a real time series signal, for example, within the signal 1420a of FIG. 14. As described above, the signal 1420a can be a serial digital signal having information associated with forty receive elements, or, in other embodiments, the signal 1420a can be a parallel digital signal having information associated with forty receive elements. In either arrangement, the signal 1906 contains digital samples associated with the first receive element in the receive assembly 1418 of FIG. 14.

In some embodiments, the signal 1906 is indicative of a received signal that sweeps in frequency from 3.5 MHz to 5.0 MHz in accordance with the transmitted swept signal 1416 described above in conjunction with FIG. 14. However, frequency content of the signal 1906 can be more complex for reasons described below in conjunction with FIG. 20.

The signal 1906 has a bandwidth of 1.5 MHz and a center frequency of 4.25 MHz. In accordance with the description above in conjunction with FIG. 14, in some embodiments, the signal 1906 can have a sample rate of about forty eight megabytes per second, and each byte can have sixteen bits.

The portion of the receive processor 1900 can include a bandshifting portion 1902. Two multiplexers 1908, 1910 can be coupled to receive the signal 1906. The multiplexer 1908 can be operable to multiply the signal 1906 by a cosine signal having a frequency of 4.25 MHz and multiplexer 1910 can be operable to multiply the signal 1906 by a sine signal having a frequency of 4.25 MHz, resulting in band-shifted signal 1908a, 1910a. The band-shifted signals 1908a, 1910a can each have a bandwidth of 0.75 MHz.

The band-shifted signal 1908a can be received by a low pass digital filter 1912, for example, a finite impulse response (FIR) digital filter, and the band-shifted signal 1908a can be received by a low pass digital filter 1914, for example, a finite impulse response (FIR) digital filter. The low pass digital filters 1912, 1914 can each have respective bandwidths of +/−0.75 MHz. The low pass filter 1912 can be operable to generate a filtered signal 1912a and the digital filter 1914 can be operable to generate a filtered signal 1914a, each with a sample rate of forty-eight mega samples per second.

A decimation processor 1916 can be coupled to receive the filtered signals 1912a, 1914a operable to process the two filtered signals 1912a, 1914a and operable to decimate the sampling rate by a factor of thirty two, resulting in a decimated signal 1916a having a sample rate of 1.5 megasamples per second (complex samples) and each sample can have twenty-four bits.

In some embodiments, the part of a receive processor 1900 can include a combining processor 1918 coupled to receive decimated signals from all of the forty channels of the part of a receive processor 1900 and operable to combine the decimated signals into a serial bit signal 1918a with a bit rate of three hundred sixty megabytes per second. The signal 1918a can be the same as or similar to each one of the signals 1402e, 1402f of FIG. 14.

Figure 20:
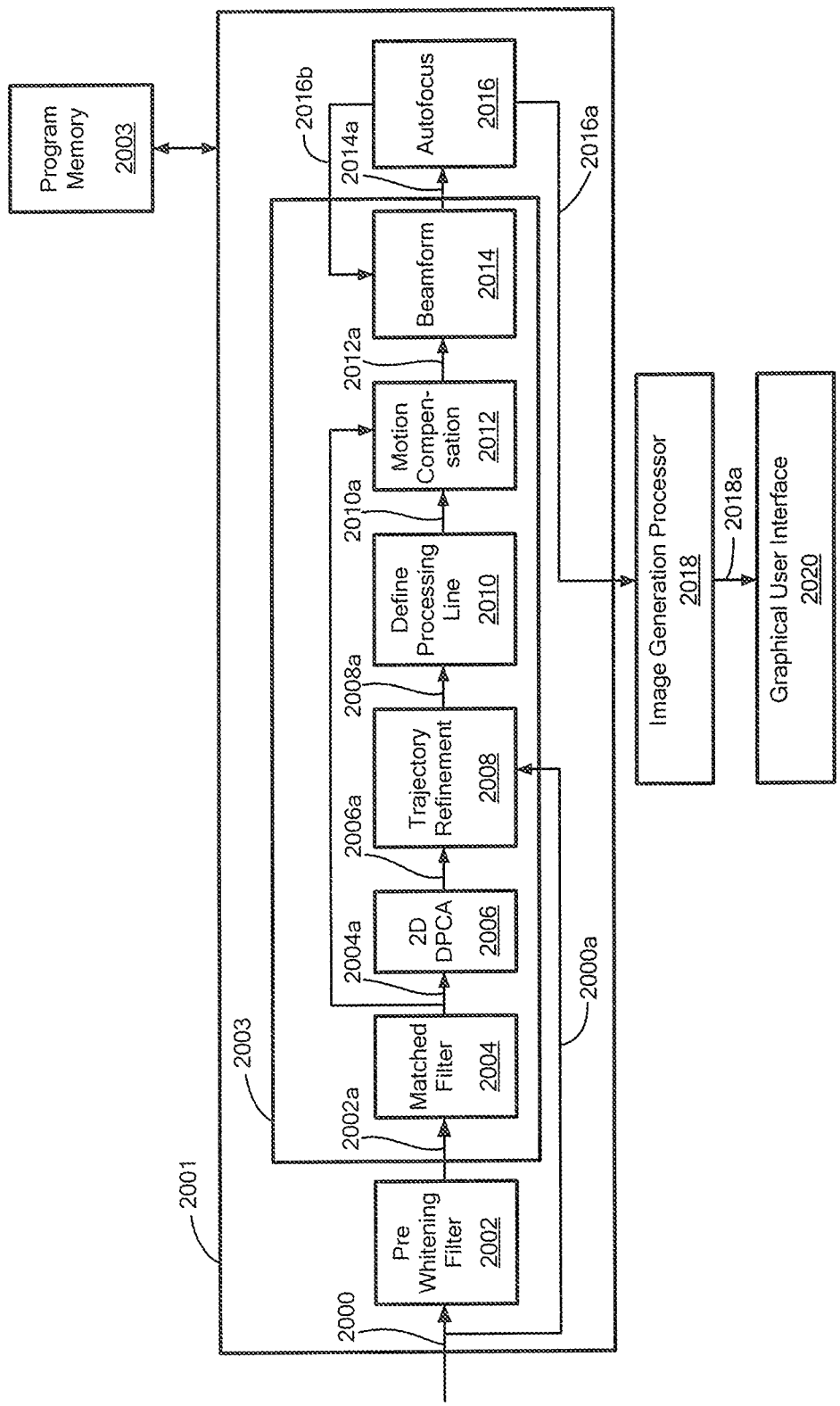
FIG. 20 is a block diagram of an example of a post processing system (processor) that can perform synthetic aperture processing upon data stored by the AUV of FIG. 1.

Referring now to FIG. 20, once the AUV 100 of FIG. 1 has been physically retrieved from the water, a computer processor 2001 can retrieve and process data from the AUV 100, for example, data stored within the memories 1424, 1426 of FIG. 14. As should be understood from the above discussion in conjunction with FIG. 14, the data stored within the memories 1424, 1426 can contain received acoustic data on, for example, forty acoustic channels, and also position data from the inertial measurement unit (IMU) 1428.

The data from the memories 1424, 1426 can be received as a signal 2000, for example, over an Ethernet link to and from the AUV 100. The signal can contain acoustic data channels (i.e., and acoustic portion) and also data from the inertial measurement unit (IMU) 1428.

Blocks shown within the computer processor 2001 are described to be individual modules as they may be formed from, for example, a computer program comprised of instructions stored in a program memory, for example, a program memory 2003.

Thus, it should be appreciated that FIG. 20 show processing modules that may be implemented in a computer processor operating upon instructions stored in a program memory.

Alternatively, functions of the processing modules can be performed by functionally equivalent circuits such as a digital signal processor circuit or an application specific integrated circuit (ASIC).

The signal 2000 can be received by a pre-whitening filter module 2002 operable to flatten a frequency spectrum of the received acoustic portion of the signal 2000 in ways described below. The pre-whitening filter module 2002 can be configured to generate a pre-whitened signal 2002a.

A matched filter 2004 is coupled to receive the pre-whitened signal 2002a and configured to generate a filtered signal 2004a. In some embodiments, the matched filter 2004 compresses the wideband frequency sweep to provide a desired across track resolution from the long transmit sweep through a process of pulse compression.

A two-dimensional displaced phase center antenna (DCPA) module 2006 can be coupled to receive the filtered signal 2004a and configured to cross correlate data from successive pings (i.e., transmitted frequency sweeps) to resolve yaw and sway of the vehicle to provide trajectory information to generate a DCPA trajectory signal 2006a.

A trajectory refinement module 2008 can be coupled to receive the DCPA trajectory signal 2006a and can be configured to combine the DCPA trajectory signal 2008a with data 2000a from the inertial measurement unit (e.g., IMU 1428 of FIG. 14) within the signal 2000 to further refine the knowledge of position of the AUV 100 during transit of the AUV 100 to generate a refined trajectory signal 2008a.

A defined processing line module 2010 can be coupled to receive the refined trajectory signal 2008a and is operable to create an optimal line (trajectory) signal 2010a to which data will be fitted for SAS processing.

A motion compensation module 2012 can be coupled to receive the optimal line signal 2010a, coupled to receive the filtered data 2004a from the matched filter 2004, and can be operable to interpolate the filtered data 2004a onto the optimal line (trajectory) signal 2010a to generate a motion compensated signal 2012a in which data from the receive elements within the AUV 100 are motion compensated over multiple pings (i.e., transmitted frequency sweeps), and therefore, can be later combined.

A beamforming module 2014 can be coupled to receive the motion compensated signal 2012a and configured to generate a beamformed signal 2014a.

It should be understood that the beamformed signal 2014a is a result of the coherent combination of received acoustic data from multiple transmissions into the water at multiple displaced array positions. This is representative of a receive array longer than and having more receive elements than the actual physical receive assembly, e.g., 1002 of FIG. 10, samples from which are within the signal 2000. Thus, the along track beamwidth (and resulting along track image resolution) of the beamformed signal 2014a is smaller than a beamwidth (and associated resolution) that would otherwise be attributed to the physical receive array were it not for the use of synthetic aperture processing.

The matched filter module 2004, the two-dimensional displaced phase center antenna (DCPA) module 2006, the trajectory refinement module 2008, the define line processing module 2020, the motion compensation module, and beamforming module 2013 can be modules with a synthetic aperture processing module 2003.

In some embodiments, an autofocus module 2016 is coupled to receive the beamformed signal 2014a and configured to generate a focused signal 2016a based on an ability of the focusing adjustment to improve the quality of a resulting SAS image. To this end, the autofocus module 2016 can adjust the beamforming module 2014 by way of an adjustment signal 2016b.

An image generation module 2018 can be coupled to receive the focused signal 2016a and configured to generate an image signal 2018a. A graphical user interface 2020 can be coupled to receive the image signal 2018a and configured to generate an image usable by a user. The image can provide a visual presentation of an underwater surface, for example, a surface of the underwater pipe 118 of FIG. 1. The image can have resolution sufficiently small so as to identify, in the image, cracks upon the surface of the underwater surface, for example, the crack 120 of FIG. 1.

While signals above are referred to in singular form, it should be understood that some of, or all of, the signals can be considered to be a respective plurality of signals arranged in serial or parallel form. For example, the signals 2000, 2012a each include acoustic data associated with the plurality of receive elements and associated receive channels (e.g., forty receive elements and forty receive channels) of the AUV 100.

In operation, particularly for a surface portion 112 of FIG. 1 that is slanted relative to the AUV 100, sound having different combinations of frequencies and distances is received during a time extent of each received swept FM signal. Examples of relationships between sound frequency and sound absorption in the water with distance are shown below in conjunction with FIGS. 21 and 22. It should be apparent from FIGS. 21 and 22 that the different frequencies and distances would otherwise result in a received signal frequency spectrum that has a shape that varies greatly during the time extent of each received swept FM signal. However, in order to generate images, for example, on the graphical user interface 2020 of FIG. 20, that has the highest fidelity and resolution, it is desirable to provide the pre-whitened signal 2002a of FIG. 20 with a flat frequency spectrum.

To this end, the pre-whitening filter 2002 can have filter characteristics that vary with time during a received swept FM signal receive by the AUV 100 of FIG. 1.

In some embodiments, the pre-whitening filter 2002 is not used. Absence of the filter can result in a reduced cross track range resolution.

Figure 21:
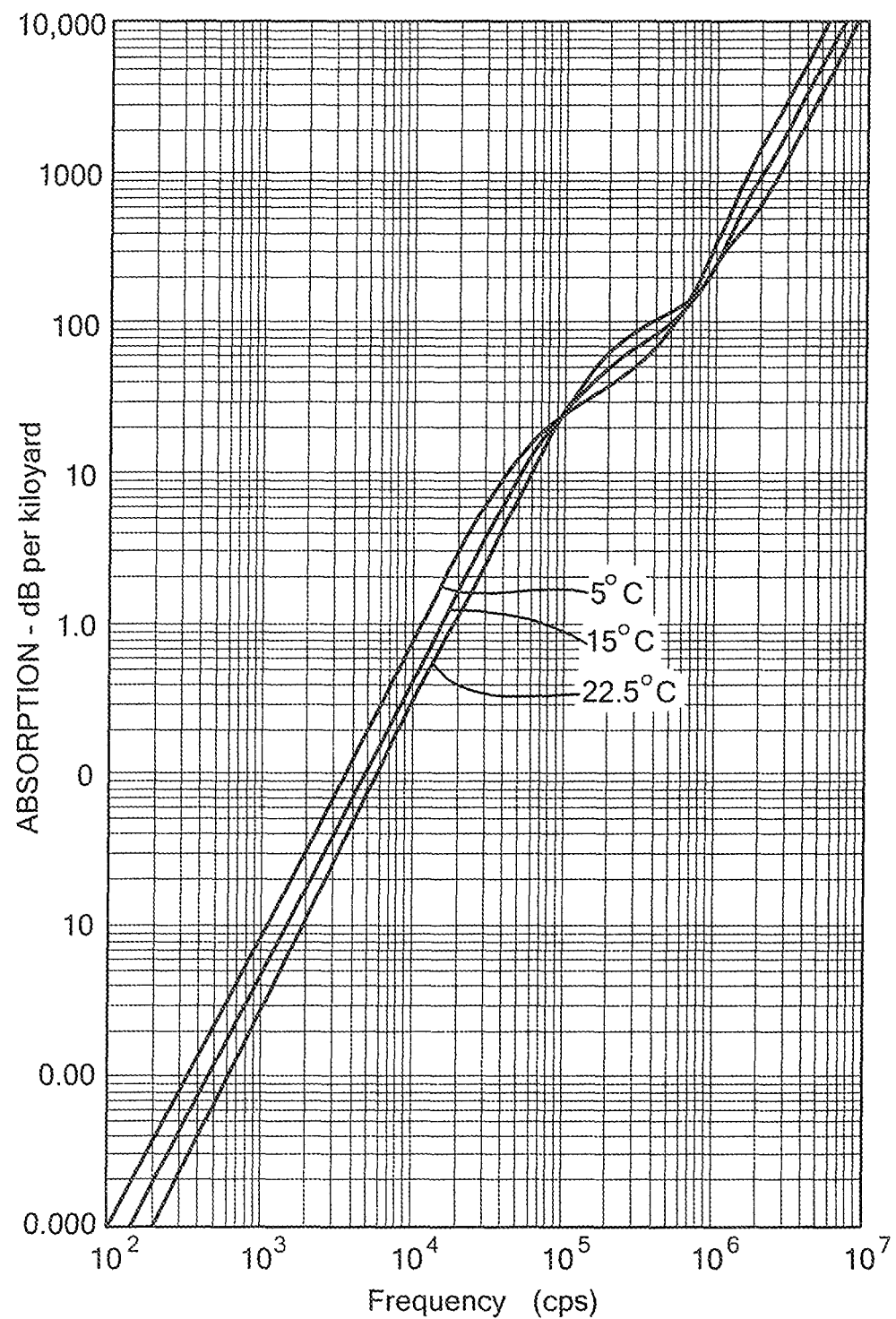
FIG. 21 is a graph showing absorption versus frequency of sound in the water.
Figure 22:
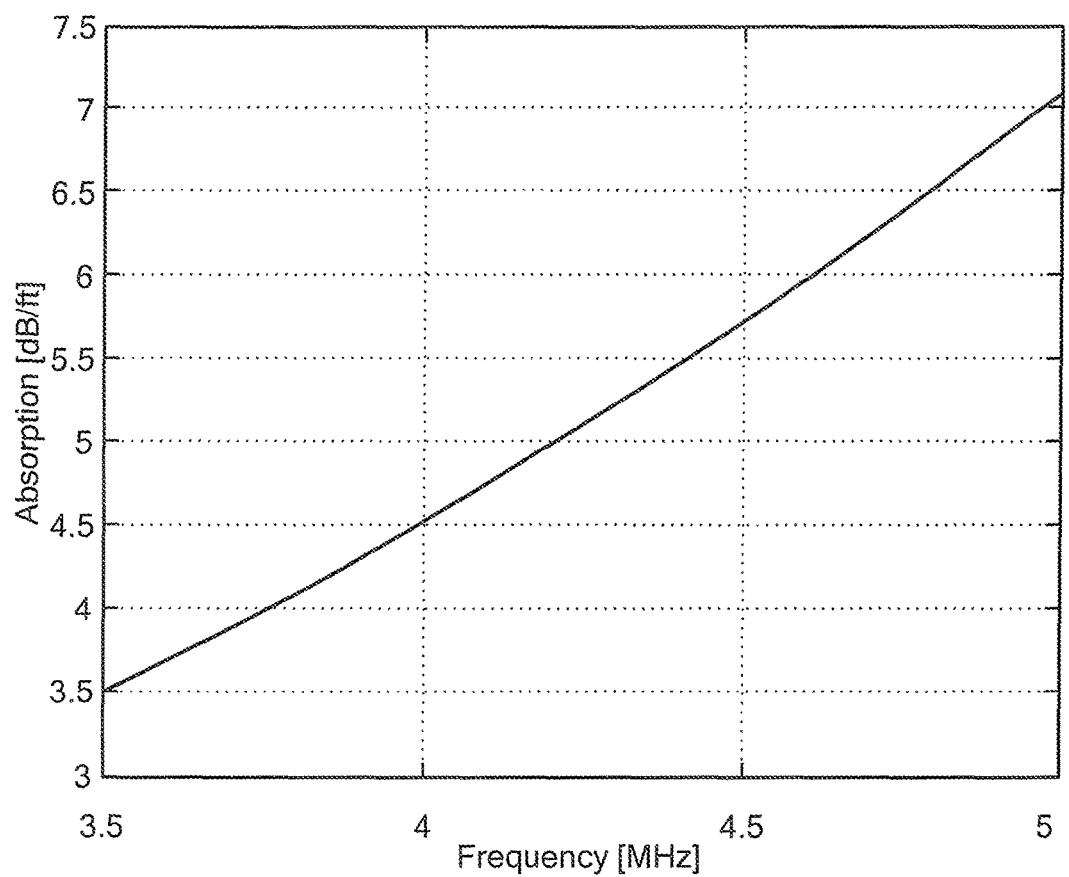
FIG. 22 is a graph showing an expanded view of absorption versus frequency of sound in the water.

Referring now to FIG. 21, with particular attention to the pre-whitening filter 2002 of FIG. 20, a graph has a horizontal axis with a logarithmic scale in units of frequency and a vertical axis with units of absorption in dB per kiloyard.

As is known, sound not only spreads as it travels through the ocean, but sound is also absorbed by molecular action of the water as it travels through the ocean. As described above, sound transmitted by the AUV 100 of FIG. 1, in order to have resolution sufficient to identify small irregularities in an underwater surface, for example, cracks, must be at fairly high frequencies. Examples used herein to describe a swept FM transmitted signal having a lowest frequency of about 3.5 MHz and the highest frequency of about 5.0 MHz. As can be seen from the graph, frequencies in this range experience a very high absorption, and therefore, some with frequencies in this range is unable to travel very far.

Referring now to FIG. 22, again with particular attention to the pre-whitening filter 2002 of FIG. 20, a graph has a horizontal axis with a linear scale in units of frequency and a vertical axis with units of absorption in dB per foot.

Referring again briefly to FIG. 1, for relatively short distances between the AUV and the underwater pipe 118, and particularly for a surface portion 112 of FIG. 1 that is slanted relative to the AUV 100, it should be apparent that sound received from the farthest edge 112b of the surface portion 112 travels at a greater distance than sound received from the closest edge 112a. Though this distance difference may be only a few feet, the difference in absorption, i.e., a difference in sound amplitude received from the farthest edge 112b and the closest edge 112a, can be significant merely due to the difference in distance traveled.

Still further, it should be apparent that different frequencies experience different absorption. Therefore, for an FM swept signal transmitted toward the surface portion 112, a first part of an echo received back at the AUV 100 comes from a first transmitted frequency (f1) and comes from the closest edge 112a. However, a later part of the echo received back at the AUV 100 includes more than one frequency. For example, a later part of the echo received back at the AUV 100 can include the first transmitted frequency (f1) but coming from the surface portion 112 between the closest edge 112a and the farthest edge 112b, in combination with a later transmitted frequency (f2) coming from the closest edge 112a.

It should be recognized that sound having different combinations of frequencies and distances is received during a time extent of each received swept FM signal. Thus, as described above, the pre-whitening filter 2002 of FIG. 20 can have filter characteristic that change with time during a time extent of each received swept FM signal received by the AUV 100 of FIG. 1.

While a transmitted frequency sweep having a range from 3.5 MHz to 5.0 MHz is described in examples above, other frequency sweeps are possible. For example, in some embodiments, a frequency sweep from about 2.0 to about 3.5 MHz, or about 2.0 MHZ to about 5.0 MHZ, can be used while still able to achieve the objective of being able to identify relatively small irregularities, (e.g., cracks) in an underwater surface.

Having described preferred embodiments of the invention it will now become apparent to those of ordinary skill in the art that other embodiments incorporating these concepts may be used. Additionally, the software included as part of the invention may be embodied in a computer program product that includes a computer-readable storage medium. For example, such a computer-readable storage medium can include a computer-readable memory device, such as a hard drive device, a RAM, a ROM, a CD-ROM, a DVD-ROM, or a computer diskette, having computer-readable program code segments stored thereon. The term computer-readable storage medium does not include a transitory signal. As used herein, the term "non-transitory" does not exclude computer readable storage media in which data may be temporarily stored. In contrast, a computer-readable transmission medium can include a communications link, either optical, wired, or wireless, having program code segments carried thereon as digital or analog signals. Accordingly, it is submitted that that the invention should not be limited to the described embodiments but rather should be limited only by the spirit and scope of the appended claims. All publications and references cited herein are expressly incorporated herein by reference in their entirety.

Elements of embodiments described herein may be combined to form other embodiments not specifically set forth above. Various elements, which are described in the context of a single embodiment, may also be provided separately or in any suitable subcombination. Other embodiments not specifically described herein are also within the scope of the following claims.

What is claimed is:

1. A method of inspecting for cracks in an underwater surface, the surface upon a man-made underwater structure, comprising:
projecting, from a moving underwater vehicle (UV) travelling substantially parallel to the underwater surface, at a separation distance from the underwater surface, and at a transit speed relative to the underwater surface, transmitted sound in an FM sweep toward the underwater surface, wherein the FM sweep has a lowest frequency, a highest frequency, and a sweep time interval between the lowest frequency and the highest frequency, wherein the lowest frequency is above about 2.0 MHz, and wherein the projecting comprises projecting the transmitted sound in a transmitting beam pattern having a beam pattern center axis;
receiving, with the underwater vehicle (UV), backscattered sound backscattered from the underwater surface, the backscattered sound responsive to the transmitted sound, wherein the receiving is performed with a plurality of receive elements having respective centers arranged in a line array with a physical aperture;
processing a plurality of signals from the plurality of receive elements with synthetic aperture processing to result in a plurality of motion compensated signals;
beamforming using the plurality of motion compensated signals to generate a beamformed signal indicative of a synthetic aperture longer than the physical aperture; and
forming an image of the surface using the beamformed signal.

2. The method of claim 1, wherein the highest frequency is above about 4.0 MHz.

3. The method of claim 1, wherein the lowest frequency is about 3.5 MHz and the highest frequency is about 5.0 MHz.

4. The method of claim 1, wherein the separation distance is between about five feet and about thirty feet.

5. The method of claim 4, wherein the sweep time interval is about ten milliseconds.

6. The method of claim 1, wherein the plurality of receive elements comprises about forty elements, and the line array has a length of about four centimeters.

7. The method of claim 1, wherein the transit speed is about 1.5 meter per second.

8. The method of claim 1, wherein the synthetic aperture processing comprises displaced phase centers processing.

9. The method of claim 1, further comprising:
storing, for a time period between the receiving and the processing, sequential digital samples representative of the plurality of signals, wherein the processing operates upon the stored sequential digital samples.

10. The method of claim 9, wherein the synthetic aperture processing comprises displaced phase centers processing.

11. The method of claim 1, wherein the forming the image comprises:
forming the image having a range and cross range resolution of less than one millimeter.

12. The method of claim 1, wherein each one of the receive elements has a respective receiving beam pattern with a vertical beamwidth and a horizontal beamwidth, both less than ninety degrees.

13. The method of claim 12, wherein the receiving beam pattern vertical beam width is about sixty degrees, the receiving horizontal beam width is about twenty degrees, and the transmit beamwidth is substantially symmetrical in azimuth and elevation and is about forty-five degrees.

14. A system for inspecting for cracks an underwater surface, the surface upon a man-made underwater structure, comprising:
an underwater vehicle (UV) for navigating substantially parallel to the underwater surface, at a separation distance from the underwater surface, and at a transit speed relative to the underwater surface, wherein the UV comprises:
a transmit assembly for transmitting sound in an FM sweep toward the underwater surface, wherein the FM sweep has a lowest frequency, a highest frequency, and a sweep time interval between the lowest frequency and the highest frequency, wherein the lowest frequency is above about 2.0 MHz, and wherein the transmitted sound has a transmitting beam pattern having a beam pattern center axis;
a receive assembly for receiving backscattered sound backscattered from the underwater surface, the backscattered sound responsive to the transmitted sound, wherein the receive assembly comprises a plurality of receive elements having respective centers arranged in a line array with a physical aperture; and an electronic memory for storing, for a time period after the receiving, sequential digital samples representative of a plurality of signals from the plurality of receive elements, wherein the system further comprises:

a computer processor comprising:
- a synthetic aperture sonar (SAS) module for processing the stored sequential digital samples to result in a plurality of motion compensated signals;
- a beamforming module for using the plurality of motion compensated signals to generate a beamformed signal indicative of a synthetic aperture longer than the physical aperture; and
- an image generation processor for forming an image of the surface using the beamformed signal.

15. The method of claim 14, wherein the highest frequency is above about 4.0 MHz.

16. The system of claim 14, wherein the lowest frequency is about 3.5 MHz and the highest frequency is about 5.0 MHz.

17. The method of claim 14, wherein the separation distance is between about five feet and about thirty feet.

18. The method of claim 14, wherein the sweep interval is about ten milliseconds.

19. The method of claim 14, wherein the plurality of receive elements comprises about forty receive elements, and the line array has a length of about four centimeters, wherein the physical aperture corresponds to the length.

20. The system of claim 14, wherein the image has a range and cross range resolution of less than one millimeter.

* * * * *